United States Patent
Ogiwara et al.

(10) Patent No.: US 7,736,774 B2
(45) Date of Patent: Jun. 15, 2010

(54) SOLID OXIDE FUEL CELL SYSTEM

(75) Inventors: Takashi Ogiwara, Tokyo (JP); Yoshio Matsuzaki, Tokyo (JP); Isamu Yasuda, Tokyo (JP); Kentaro Ito, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 1057 days.

(21) Appl. No.: 10/503,711

(22) PCT Filed: Feb. 5, 2003

(86) PCT No.: PCT/JP03/01156

§ 371 (c)(1),
(2), (4) Date: Aug. 4, 2004

(87) PCT Pub. No.: WO03/067698

PCT Pub. Date: Aug. 14, 2003

(65) Prior Publication Data

US 2005/0089731 A1  Apr. 28, 2005

(30) Foreign Application Priority Data

Feb. 5, 2002 (JP) ............... 2002-028847
Feb. 5, 2002 (JP) ............... 2002-069314

(51) Int. Cl.
*H01M 8/04* (2006.01)
*H01M 8/18* (2006.01)
*H01M 8/10* (2006.01)
*H01M 2/00* (2006.01)
*H01M 2/02* (2006.01)

(52) U.S. Cl. ............... 429/17; 429/19; 429/20; 429/30; 429/34

(58) Field of Classification Search ............... 429/17, 429/19, 20, 30, 34
See application file for complete search history.

(56) References Cited

U.S. PATENT DOCUMENTS

| 4,729,931 | A |   | 3/1988  | Grimble |
| 4,844,837 | A | * | 7/1989  | Heck et al. ............... 252/373 |
| 5,366,819 | A | * | 11/1994 | Hartvigsen et al. ............... 429/17 |
| 5,480,738 | A |   | 1/1996  | Elangovan et al. |

(Continued)

FOREIGN PATENT DOCUMENTS

JP        63-138666        6/1988

(Continued)

*Primary Examiner*—Dah-Wei Yuan
*Assistant Examiner*—Julian Mercado
(74) *Attorney, Agent, or Firm*—Flynn, Thiel, Boutell & Tanis, P.C.

(57) ABSTRACT

There are provided a solid oxide fuel cell system made up of (a) a solid oxide fuel cell stack, (b) a preliminary reformer for removing hydrocarbons having two or more carbon atoms from a hydrocarbon fuel by converting the hydrocarbons having two or more carbon atoms into methane, hydrogen, and carbon monoxide, and (c) an integrated heat exchanger for catalytic combustion for heating either air or fuel, or both the air and fuel, to be guided to the solid oxide fuel cell stack, by use of a combustion gas formed by combusting discharged fuel with the use of discharged air, wherein the component equipment described above are disposed in an adiabatic vessel and the integrated heat exchanger for catalytic combustion for use in the solid oxide fuel cell system.

25 Claims, 25 Drawing Sheets

U.S. PATENT DOCUMENTS

| | | |
|---|---|---|
| 5,498,487 A | 3/1996 | Ruka et al. |
| 2001/0031387 A1 | 10/2001 | Takeda et al. |
| 2001/0049039 A1 | 12/2001 | Haltiner, Jr. |

FOREIGN PATENT DOCUMENTS

| | | |
|---|---|---|
| JP | 04-56072 | 2/1992 |
| JP | 05-47395 | 2/1993 |
| JP | 07-176315 | 7/1995 |
| JP | 09-508747 | 9/1997 |
| JP | 2001-106513 | 4/2001 |
| JP | 2001-507501 | 6/2001 |
| JP | 2002-289244 | 10/2002 |
| JP | 2002-367615 | 12/2002 |
| WO | WO 96/02951 | 2/1996 |
| WO | WO 02/05363 | 1/2002 |

* cited by examiner

SELF-SUPPORTING MEMBRANE TYPE SOFC

SUPPORTED MEMBRANE TYPE SOFC

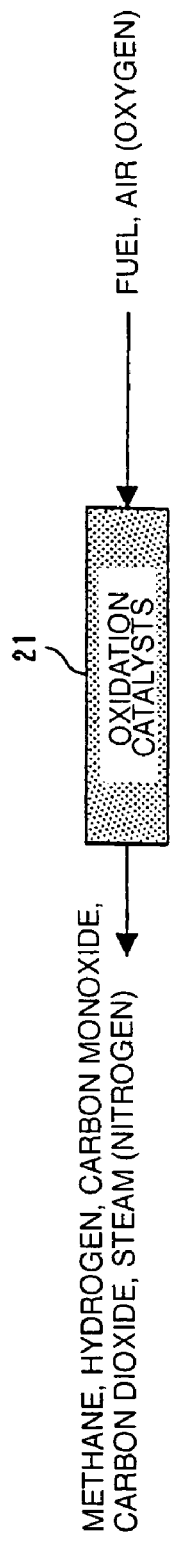
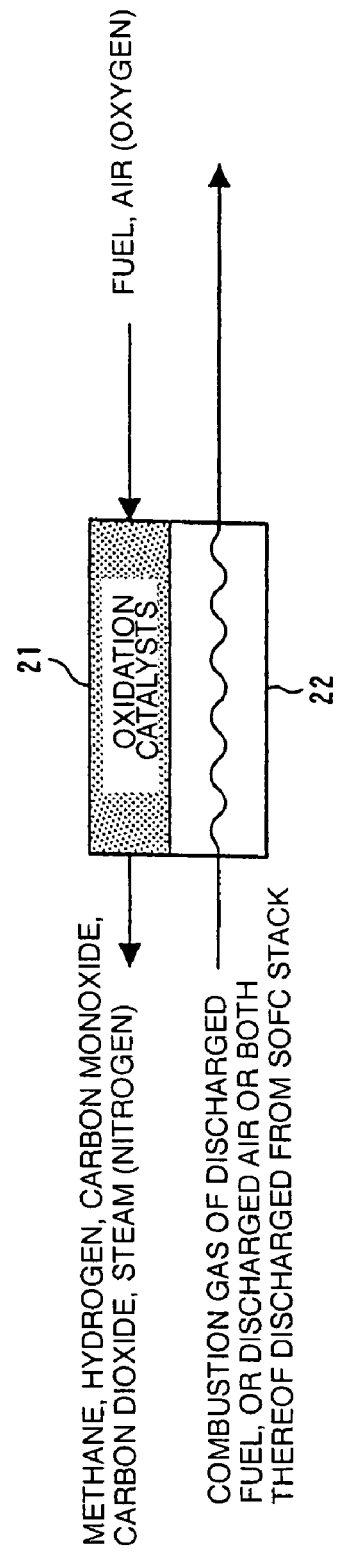

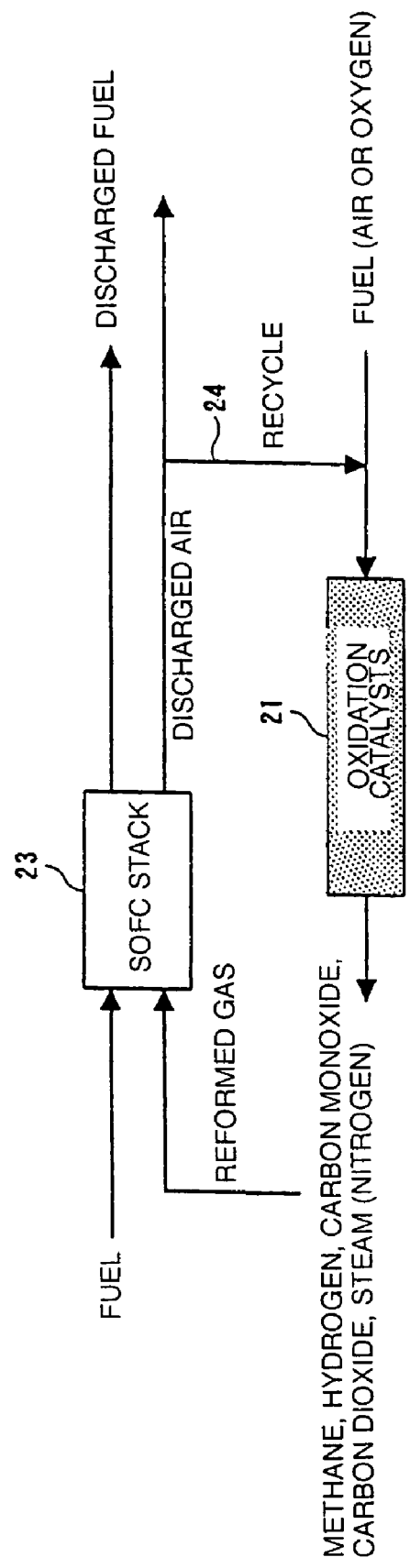

SOLID OXIDE FUEL CELL SYSTEM

TECHNICAL FIELD

The invention relates to a solid oxide fuel cell system comprising a solid oxide fuel cell stack, a preliminary reformer, and an integrated heat exchanger for catalytic combustion, housed in an adiabatic vessel, and the integrated heat exchanger for catalytic combustion for use in the same.

BACKGROUND TECHNOLOGY

A solid oxide fuel cell (Solid Oxide Fuel Cell: hereinafter referred to as an SOFC as necessary) is characterized in that an oxide ion ($O^{2-}$) conductor is used as a solid electrolyte and is made up of a fuel electrode and an oxygen electrode, disposed in such a way as to sandwich a solid oxide electrolyte therebetween. At the time of operation, an electrochemical reaction is caused to occur by feeding fuel toward the fuel electrode and an oxidizing agent toward the oxygen electrode, thereby extracting electric power. As the oxidizing agent fed toward the oxygen electrode, use is made of oxygen-enriched air, oxygen, etc. besides air, however, the description will be given hereinafter assuming that the oxygen electrode is an air electrode and the oxidizing agent is air as appropriate.

FIG. 1 is a schematic illustration showing a disposition relation among a solid oxide electrolyte, a fuel electrode and an air electrode, making up a single SOFC, and the operation principle thereof. The single cell is made up such that the fuel electrode and air electrode are disposed with the solid oxide electrolyte interposed therebetween. Oxygen contained in air guided to the air electrode is turned into oxide ions ($O^{2-}$), reaching the fuel electrode after passing through the solid oxide electrolyte. Hereupon, the oxide ions ($O^{2-}$) react with a fuel, such as hydrogen, and so forth, guided to the fuel electrode, to release electrons, thereby producing reaction products such as electricity, water, and so forth. Air after use at the air electrode is discharged as an off-gas of the air electrode and fuel after use at the fuel electrode is discharged as an off-gas of the fuel electrode. In the present specification, the off-gas of the air electrode is referred to as discharged air and the off-gas of the fuel electrode is referred to as discharged fuel.

FIGS. 2 and 3 are schematic illustrations showing a mode of a flat plate type SOFC, respectively, by way of example. The SOFC includes a cylindrical type, an integrated stacked type, and so forth; however, these types are the same in principle as the flat plate type SOFC. FIG. 2 is the schematic illustration showing a self-supporting membrane type SOFC while FIG. 3 is the schematic illustration showing a supported membrane type SOFC. In FIGS. 2 and 3, there is shown a single cell, respectively, however, since a voltage of one unit of the single cell is low, the single cells are normally stacked one on top of another in a plurality of layers. In the present specification and drawings, a structure made up by stacking the single cells one on top of another in a plurality of layers is referred to as a solid oxide fuel cell stack (=an SOFC stack) or simply as a stack.

In the case of the self-supporting membrane type SOFC, as shown in FIG. 2, a sealant 2 and a separator 3 are sequentially disposed on top of a single cell 1 while a separator 4, a sealant 5, and a separator 6 are sequentially disposed underneath the single cell 1, these component members being closely stacked to thereby make up the self-supporting membrane type SOFC. For the sealants 2, 5, use is made of a ceramic material such as glass, or the like, and for the separators 3, 6, use is made of a ceramic material such as $MgAl_2O_4$—MgO, or the like, while for the separators 4, use is made of a ceramic material such as lanthanum chromite, and so forth.

In the case of the self-supporting membrane type SOFC, the structure is retained by a solid oxide electrolyte membrane by itself. Accordingly, the solid oxide electrolyte membrane is required to have a large film thickness thereof and is normally formed to a thickness on the order of 100 μm. Further, the operational temperature thereof is in a range of 800° C. to 1000° C., normally as high as about 1000° C., forming a high temperature field in excess of 1000° C. inside the stack. The component members thereof are therefore limited to expensive heat-resistant alloys or ceramics. In the case of the ceramics, there arise such problems as cracks occurring thereto due to differences in temperature occurring inside the stack, and so forth, while in the case of housing the stack in an adiabatic vessel, a thermal insulating material of the adiabatic vessel increases in thickness, resulting in an increase in the size of an SOFC system.

On the other hand, in the case of the supported membrane type SOFC, as shown in FIG. 3, a single cell 7 is retained inside the frame of a spacer 8, and on top of the single cell 7, there are sequentially disposed a bonding material 9, a cell supporter 10, a spacer 11, and a separator 12. Although there are also sequentially disposed a bonding material, cell supporter, spacer, and separator underneath the single cell 7, these component members are omitted in FIG. 3. In the case of the supported membrane type SOFC, a solid oxide electrolyte membrane is made up by use of, for example, a $LaGaO_3$-based or zirconia-based material, being formed to have a film thickness as small as, for example, on the order of 10 μm, so as to be supported by a fuel electrode large in film thickness.

The inventor et al. have focused attention on the supported membrane type SOFC, in particular, and continued efforts for the development thereof, having thus far obtained several successful results (JP-A 2002-367615). With the supported membrane type, since, for example, the solid oxide electrolyte membrane can be formed to a small film thickness, it is possible to perform operations at a low temperature, lower than the temperature in the case of the self-supporting membrane type, that is, in a range of 650° C. to 850° C., for example, at as low as 750° C. As a result, for the constituent material of the spacer 8, bonding material 9, cell supporter 10, spacer 11, separator 12, and so forth, respectively, use can be made of an inexpensive material such as stainless steel, for example, ferritic stainless steel etc. and furthermore, the supported membrane type SOFC has various other advantages including implementation of a reduction in size.

Incidentally, with the SOFC, carbon monoxide as well is used as fuel besides hydrogen. Accordingly, in the case of using town gas, LP gas, etc., containing hydrocarbons as constituents, for raw fuel, such raw fuel is reformed so as to be converted into hydrogen and carbon monoxide before use. Methane, among hydrocarbons, is converted into hydrogen and carbon monoxide through internal reformation by the agency of catalysts such as Ni, and so forth, provided at the fuel electrode of the SOFC and they are used as the fuel of the SOFC.

However, if the raw fuel contains hydrocarbons other than methane, that is, hydrocarbons having two or more carbon atoms, such as ethane, ethylene, propane, butane, etc., this will cause carbon to be formed on piping to the SOFC and the fuel electrode, which blocks the electrochemical reaction, thereby resulting in deterioration in cell performance. These problems attributable to the hydrocarbons having two or more carbon atoms will have vital effects on the SOFC which is repeatedly operated for a long time period while in service.

Town gas, LP gas, natural gas, gasoline, or kerosene, etc. includes hydrocarbons other than methane, that is, hydrocarbons having two or more carbon atoms. For example, in the case of town gas, to give an example of the composition thereof, the same contains 88.5% methane, 4.6% ethane, 5.4% propane, 1.5% butane (herein % represents vol. %, the same applies hereinafter), so that about 11.5% of hydrocarbons having two to four carbon atoms are contained in addition to methane as the main constituent thereof. For this reason, in order to use those as the raw fuel of the SOFC, there is the need for reforming those hydrocarbons having two or more carbon atoms such that the hydrocarbons having two or more carbon atoms are removed by converting the same into methane, hydrogen, and carbon monoxide.

There are available the steam reforming process and partial combustion process as processes for reforming hydrocarbons. These processes represent techniques for converting hydrocarbons into a reformed gas with hydrogen as the main constituent thereof and, in the case of hydrocarbons being, for example, methane, the steam reformation reaction can be expressed by the following formula:

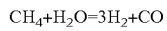

$$CH_4 + H_2O = 3H_2 + CO$$

With the SOFC, however, not only hydrogen and carbon monoxide, needless to say, but also methane as well after conversion into hydrogen and carbon monoxide, upon internal reformation at the fuel electrode, can be used as fuel, so that it needs only to be sufficient if the hydrocarbons having two or more carbon atoms are removed from the fuel in a stage of being fed to the fuel electrode of the SOFC, thus eliminating the need for reformation of the fuel up to a reformed gas with hydrogen and carbon monoxide as main constituents thereof.

Thus, for the reformation of the raw fuel for use in the SOFC, it will suffice to remove the hydrocarbons having two or more carbon atoms by conversion thereof into other constituents such as methane, hydrogen, carbon monoxide, etc., so that it is unnecessary to convert all the hydrocarbons into hydrogen, and carbon monoxide. Accordingly, with an SOFC system, use is made of a reformer for executing reformation whereby the hydrocarbons having two or more carbon atoms are converted into other constituents such as methane, hydrogen, carbon monoxide, etc. to be thereby removed from the raw fuel. That is, with the reformer of the raw fuel for use in the SOFC, there is no need for converting all the hydrocarbons into hydrogen, and carbon monoxide, and the hydrocarbons having two or more carbon atoms, contained in the raw fuel are converted into methane, hydrogen, carbon monoxide, etc., resulting in removal of the hydrocarbons having two or more carbon atoms.

In the present specification and drawings, a reformer used for this purpose is referred to as a preliminary reformer, and fuel prior to preliminary reformation with the use of the preliminary reformer is referred to as raw fuel.

FIG. 4 is a schematic illustration showing a system wherein the preliminary reformer according to the steam reforming process is disposed together with the SOFC stack, using the town gas, LP gas, and so forth as the raw fuel. As shown in FIG. 4, there are sequentially disposed a desulfurizer 13, a steam generator 14, a preliminary reformer 15, and a SOFC stack 16. There can be a case where the steam generator 14 is integrated with the preliminary reformer 15. If a sulfur compound is contained in the raw fuel, the fuel electrode of the SOFC will undergo poisoning caused by the sulfur compound. The town gas, and LP gas contain sulfur compounds such as mercaptan, and others, serving as an odorant, and natural gas, gasoline, etc. also contain sulfur compounds such as hydrogen sulfide, and so forth, although the content thereof varies depending on production sites, and so forth. The desulfurizer 13 is used for removal of the sulfur compounds from the raw fuel, but the desulfurizer 13 is unnecessary if the raw fuel does not contain sulfur or sulfur has already been removed. The raw fuel, after being desulfurized in the desulfurizer 13, is fed to the preliminary reformer 15 together with steam generated by the steam generator 14, whereupon the hydrocarbons having two or more carbon atoms are reformed to be converted into methane, hydrogen, carbon monoxide, and so forth. A reformed gas is guided to the fuel electrode of the SOFC stack 16.

Now, as described above, the operational temperature of the self-supporting membrane type SOFC is in the range of 800° C. to 1000° C., and is normally at as high as about 1000° C., and the operational temperature of the supported-membrane type SOFC is not higher than about 850° C., that is, lower than the operational temperature of the self-supporting membrane type SOFC, but is still high. For this reason, there is the need for reducing heat loss from the SOFC stack, the preliminary reformer, and so forth, as much as possible, and accordingly, it is considered appropriate to house those component equipment in the adiabatic vessel, or to cover the same with a thermal insulating material. In addition, in view of the need for retaining a constant temperature in the above-described range during the operation of the system, it is desirable to heat air and fuel to be guided to the SOFC before feeding the same.

It is therefore an object of the invention to provide an SOFC system wherein by combined use of an SOFC stack, a preliminary reformer for use in SOFCs, and an integrated heat exchanger for catalytic combustion for use in the SOFCs, constituting the SOFC system, respective advantages of both equipment, that is, the preliminary reformer and the integrated heat exchanger for catalytic combustion, are obtained, and heat loss of the SOFC system is eliminated or reduced as much as possible, and also to provide the integrated heat exchanger for catalytic combustion for use in the SOFC system.

DISCLOSURE OF THE INVENTION

The invention provides a solid oxide fuel cell system comprising (a) a solid oxide fuel cell stack, (b) a preliminary reformer for removing hydrocarbons having two or more carbon atoms from a hydrocarbon fuel by converting the hydrocarbons having two or more carbon atoms into methane, hydrogen, and carbon monoxide, and (c) an integrated heat exchanger for catalytic combustion for heating air and/or fuel (that is, either air or fuel, or both) to be guided to the solid oxide fuel cell stack, by use of a combustion gas formed by combusting discharged fuel from the solid oxide fuel cell stack with the use of discharged air, wherein component equipment described above are disposed in an adiabatic vessel. Herein, "in an adiabatic vessel" described above means to include a case where the SOFC stack and various component equipment thereof are covered with a thermal insulating material. Further, the invention provides an integrated heat exchanger for catalytic combustion disposed in the vicinity of an SOFC stack, suitable for use in the solid oxide fuel cell system, described under items (1) to (6) below:

(1) an integrated heat exchanger for catalytic combustion, disposed in the vicinity of a solid oxide fuel cell stack, comprising a catalytic combustion layer for causing discharged fuel from the solid oxide fuel stack to undergo combustion with discharged air from the solid oxide fuel cells, a first heat exchanger utilizing a combustion gas formed in the catalytic combustion layer as a heating source, and a second heat exchanger, wherein air to be guided into the solid oxide fuel cell stack is preheated in the first heat exchanger by use of the combustion gas formed in the catalytic combustion layer to be subsequently heated in the second heat exchanger by use of the discharged air or the discharged fuel, from the solid oxide fuel cell stack, or both, before being fed to the solid oxide fuel cell stack.

(2) an integrated heat exchanger for catalytic combustion, disposed in the vicinity of a solid oxide fuel cell stack, comprising a catalytic combustion layer for causing discharged fuel from the solid oxide fuel stack to undergo combustion with discharged air from the solid oxide fuel cells, a first heat exchanger utilizing a combustion gas formed in the catalytic combustion layer as a heating source, and a second heat exchanger, wherein fuel to be guided into the solid oxide fuel cell stack is preheated in the first heat exchanger by use of the combustion gas formed in the catalytic combustion layer to be subsequently heated in the second heat exchanger by use of the discharged air or the discharged fuel, from the solid oxide fuel cell stack, or both, before being fed to the solid oxide fuel cell stack.

(3) an integrated heat exchanger for catalytic combustion, disposed in the vicinity of a solid oxide fuel cell stack, comprising a catalytic combustion layer for causing discharged fuel from the solid oxide fuel stack to undergo combustion with discharged air from the solid oxide fuel cells, a first heat exchanger utilizing a combustion gas formed in the catalytic combustion layer as a heating source, and a second heat exchanger, wherein air and fuel to be guided into the solid oxide fuel cell stack are preheated in the first heat exchanger by use of the combustion gas formed in the catalytic combustion layer to be subsequently heated in the second heat exchanger by use of the discharged air or the discharged fuel, from the solid oxide fuel cell stack, or both, before being fed to the solid oxide fuel cell stack.

(4) an integrated heat exchanger for catalytic combustion, disposed in the vicinity of a solid oxide fuel cell stack, comprising a catalytic combustion layer for causing discharged fuel from the solid oxide fuel cells to undergo combustion with discharged air from the solid oxide fuel cell stack, a first heat exchanger utilizing a combustion gas formed in the catalytic combustion layer as a heating source, and a second heat exchanger, wherein air to be guided into the solid oxide fuel cell stack is preheated in the second heat exchanger by use of the discharged air or the discharged fuel, from the solid oxide fuel cell stack, or both, to be subsequently heated in the first heat exchanger by use of the combustion gas formed in the catalytic combustion layer before being fed to the solid oxide fuel cell stack.

(5) an integrated heat exchanger for catalytic combustion, disposed in the vicinity of a solid oxide fuel cell stack, comprising a catalytic combustion layer for causing discharged fuel from the solid oxide fuel cells to undergo combustion with discharged air from the solid oxide fuel cell stack, a first heat exchanger utilizing a combustion gas formed in the catalytic combustion layer as a heating source, and a second heat exchanger, wherein fuel to be guided into the solid oxide fuel cell stack is preheated in the second heat exchanger by use of the discharged air or the discharged fuel, from the solid oxide fuel cell stack, or both, to be subsequently heated in the first heat exchanger by use of the combustion gas formed in the catalytic combustion layer before being fed to the solid oxide fuel cell stack.

(6) an integrated heat exchanger for catalytic combustion, disposed in the vicinity of a solid oxide fuel cell stack, comprising a catalytic combustion layer for causing discharged fuel from the solid oxide fuel cells to undergo combustion with discharged air from the solid oxide fuel cell stack, a first heat exchanger utilizing a combustion gas formed in the catalytic combustion layer as a heating source, and a second heat exchanger, wherein air and fuel to be guided into the solid oxide fuel cell stack is preheated in the second heat exchanger by use of the discharged air or the discharged fuel, from the solid oxide fuel cell stack, or both, to be subsequently heated in the first heat exchanger by use of the combustion gas formed in the catalytic combustion layer before being fed to the solid oxide fuel cell stack.

BRIEF DESCRIPTION OF THE DRAWINGS

FIGS. 9(a) and 9(b) are schematic representations illustrating modes of the preliminary reformer employing the partial combustion process.

FIG. 10 is a schematic representation illustrating another mode of the preliminary reformer employing the partial combustion process.

BEST MODE FOR CARRYING OUT THE INVENTION

Figure 1:
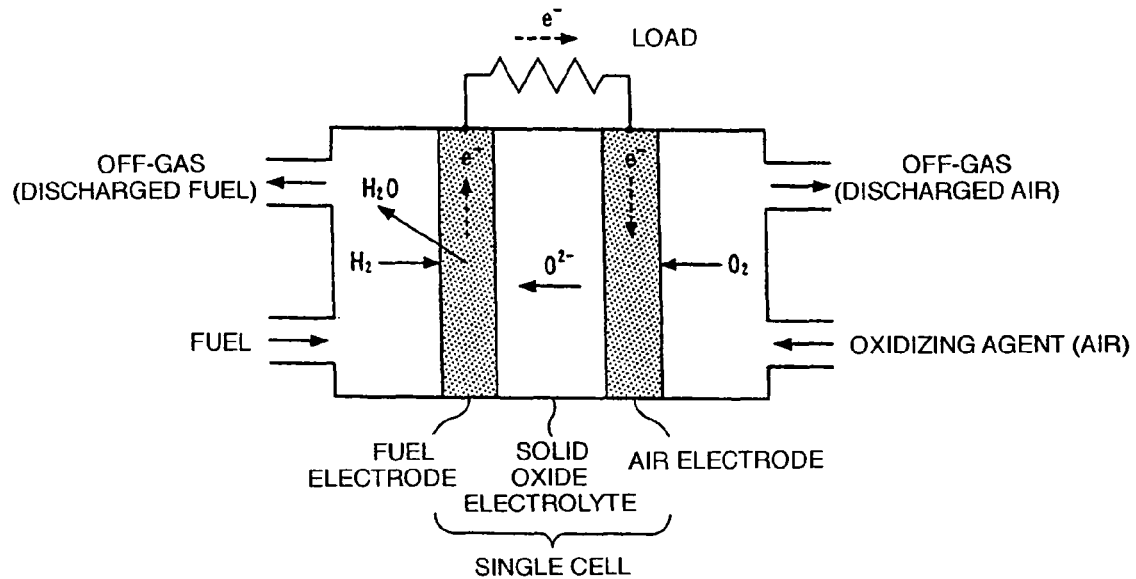
FIG. 1 is a schematic illustration showing a disposition relation among a solid oxide electrolyte, a fuel electrode and an air electrode, making up a single SOFC, and the operation principle thereof.
Figure 2:
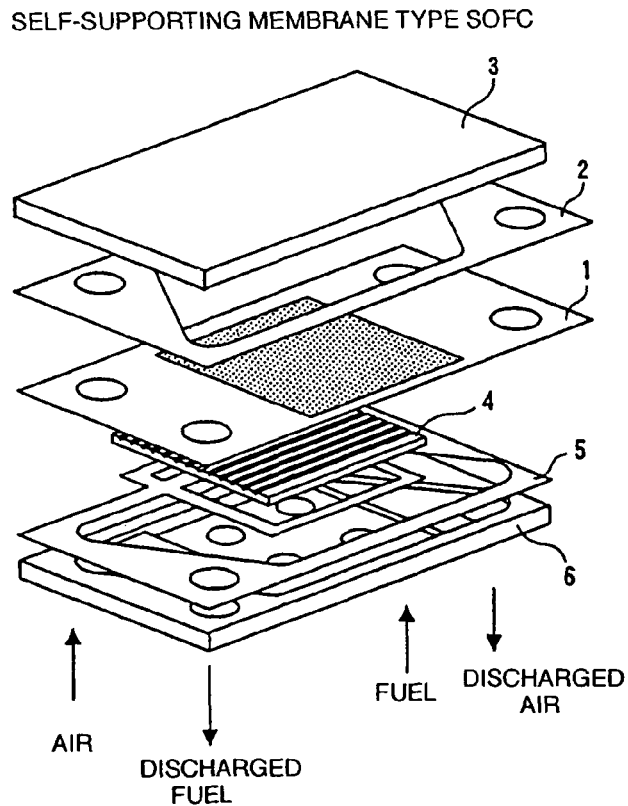
FIG. 2 is a schematic illustration showing the structure of a self-supporting membrane type SOFC.
Figure 3:
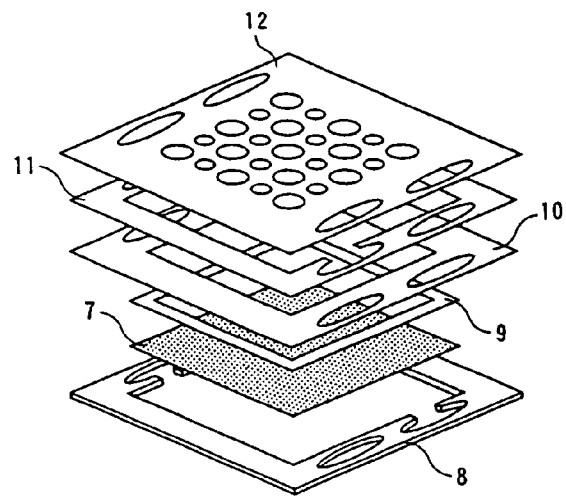
FIG. 3 is a schematic illustration showing the structure of a supported membrane type SOFC.
Figure 4:
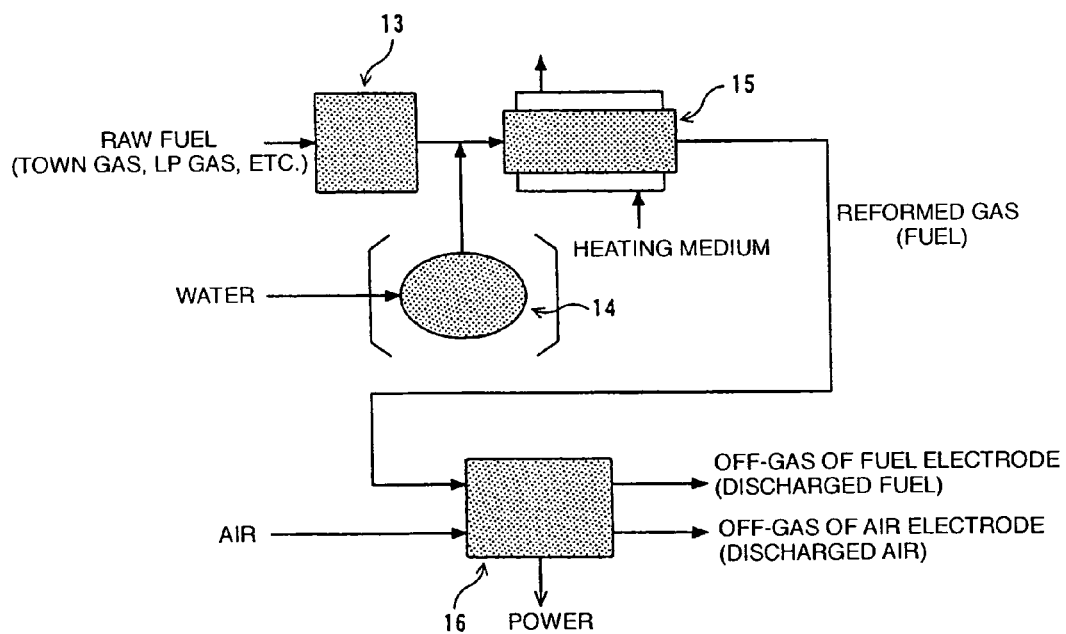
FIG. 4 is a schematic illustration showing a system wherein a preliminary reformer according to the steam reforming process is disposed together with a SOFC stack, using a town gas, LP gas, and so forth as raw fuel.
Figure 5:
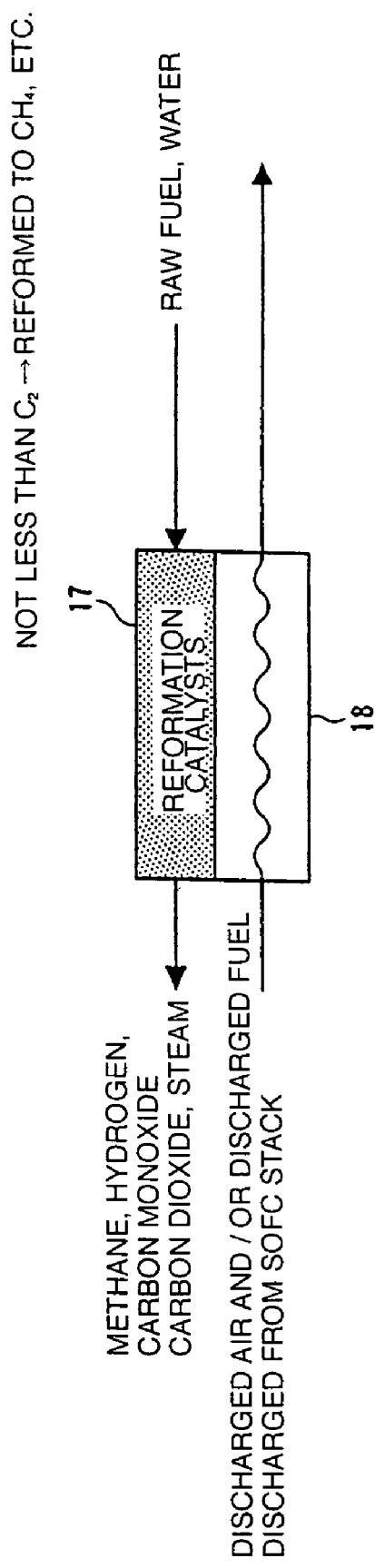
FIG. 5 is a schematic representation illustrating a mode of the preliminary reformer employing the steam reforming process.

Embodiments of a solid oxide fuel cell system according to the invention are made up of an SOFC stack, a preliminary reformer for removing hydrocarbons having two or more carbon atoms from raw fuel to be guided into the SOFC stack and an integrated heat exchanger for catalytic combustion, for heating air and/or fuel (that is, either air or fuel, or both thereof), all component members being disposed together inside an adiabatic vessel. Respective modes of the preliminary reformer and the integrated heat exchanger for catalytic combustion according to the invention are described in that order hereinafter.

Modes of the Preliminary Reformer

The preliminary reformer according to the invention is a reformer for converting hydrocarbons having two or more carbon atoms, contained in raw fuel for use in the SOFC stack, into methane, hydrogen, carbon monoxide, and so forth, and resultantly removing the hydrocarbons having two or more carbon atoms from the raw fuel. Hence, formation of carbon, attributable to the presence of the hydrocarbons having two or more carbon atoms, is prevented, thereby preventing the precipitation of carbon from occurring in piping to the SOFC stack and fuel electrodes thereof, so that the power generation by the SOFC stack can be stably continued for a long period of time.

With the preliminary reformer, there is a case where heating is required as well as a case where heating is not required, and in the case where heating is required, as a heating source, use is made of discharged air, and/or discharged fuel (that is, either discharged air or discharged fuel, or both thereof), or use is made of a combustion gas formed by combusting the discharged fuel with the discharged air.

The preliminary reformer is filled with reformation catalysts in the case of employing the steam reforming process, and the same is filled with oxidation catalysts in the case of employing the partial combustion process. There is no particular limitation to the reformation catalysts for use in the steam reforming process provided that the catalysts are capable of removing the hydrocarbons having two or more carbon atoms from the raw fuel by converting the hydrocarbons having two or more carbon atoms into methane, hydrogen, carbon monoxide, and so forth, including, for example, an Ni-based catalyst (for example, an Ni catalyst with alumina as a carrier), a Ru-based catalyst (for example, a Ru catalyst with alumina as a carrier), and so forth.

In the case of employing the partial combustion process, there is no particular limitation to the oxidation catalysts for filling up the preliminary reformer provided that those are catalysts capable of removing the hydrocarbons having two or more carbon atoms from the raw fuel by partially oxidizing the raw fuel and converting the hydrocarbons having two or more carbon atoms into methane, hydrogen, carbon monoxide, and so forth. For example, use is made of catalysts of a noble metal such as platinum, palladium, and so forth. These catalysts of noble metals are used in such a form as supported by a carrier such as alumina and so forth.

As the raw fuel, use is made of a gaseous fuel such as town gas, LP gas, natural gas, etc., and a liquid fuel such as gasoline, kerosene, alcohol, etc. After reformation of the raw fuel in the preliminary reformer according to the invention, a reformed gas contains carbon dioxide, steam, and so forth, besides methane, hydrogen, and carbon monoxide, however, since the hydrocarbons having two or more carbon atoms, such as ethane and others, are removed, carbon is prevented from being precipitated on piping reaching the fuel electrodes of the SOFC stack and on the fuel electrodes of the SOFC stack.

In the present specification, fuel prior to the reformation by the preliminary reformer is referred to as a raw fuel while fuel after the reformation by the preliminary reformer is referred to as a reformed gas or fuel.

Modes of the Preliminary Reformer Employing the Steam Reforming Process

With the preliminary reformer employing the steam reforming process, heating is normally required to promote the reforming reaction. The heating increment is dependent on the quantity of the hydrocarbons having two or more carbon atoms, contained in the raw fuel. While a conversion reaction of methane, that is, a hydrocarbon having one carbon atom, into hydrogen, carbon monoxide, and carbon dioxide is an endothermic reaction, a conversion reaction of hydrocarbons having two or more carbon atoms into methane is an exothermic reaction, so that in the case of LP gas and so forth, having a high content of the hydrocarbons having two or more carbon atoms, the conversion reaction thereof on the whole becomes an exothermic reaction.

That is, in the case where the raw fuel is, for example, town gas, the content of the hydrocarbons having two or more carbon atoms, contained in the town gas, is lower as compared with that for LP gas, and so forth. Accordingly, in the preliminary reformer employing the steam reforming process, a heat absorption value, due to the conversion of methane into hydrogen, carbon monoxide, and carbon dioxide, is predominant over a heating value due to the conversion of the hydrocarbons having two or more carbon atoms into methane in the case of using the town gas, so that the reaction on the whole becomes endothermic. In contrast, in the case of LP gas and so forth, having a higher content of the hydrocarbons having two or more carbon atoms as compared with that of methane, the reaction on the whole becomes exothermic. Accordingly, it is possible in this case to either reduce the heating with a heating source in proportion to the hydrocarbons having two or more carbon atoms, contained in the raw fuel, or to eliminate the need for heating.

With the preliminary reformer according to the invention, the discharged air, and/or the discharged fuel, fed from the SOFC stack, is utilized as a heating source necessary for reformation. A combustion gas formed by combusting the discharged fuel with the discharged air may be used as the heating source. At a time when the preliminary reformer is in operation, reformation catalysts are preferably at a temperature in a range of about 300° C. to 600° C., and an S/C ratio is preferably in a range of 1.5 to 6.0 although there is no particular limitation thereto.

Figure 6:
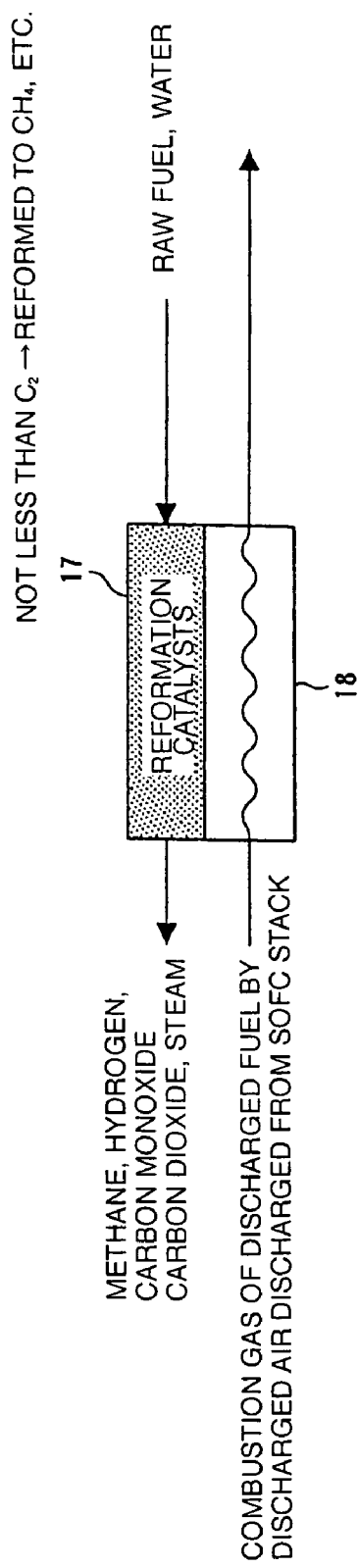
FIG. 6 is a schematic representation illustrating another mode of the preliminary reformer employing the steam reforming process.

FIGS. 5 to 8 are schematic representations illustrating modes of the preliminary reformer employing the steam reforming process. With the mode shown in FIGS. 5 and 6, respectively, among these figures, water together with the raw fuel are fed to a preliminary reformer 17 filled up with reformation catalysts, and the water and the raw fuel are caused to react with each other, thereby forming a reformed gas from which the hydrocarbons having two or more carbon atoms have been removed. The discharged air, and/or the discharged fuel, from the SOFC stack, is utilized as the heating source, and the reformation catalysts in the preliminary reformer 17 are indirectly heated by a heat exchanger 18. The combustion gas formed by combusting the discharged fuel with the discharged air can also be used as the heating source thereof. The mode in such a case is shown in FIG. 6.

When the SOFC system is in operation, the discharged air and the discharged fuel are at a temperature approximately as high as the temperature of the SOFC stack, and the combustion gas formed by both is at a still higher temperature, so that it is possible to provide heat necessary for the reformation. Water to be fed to the preliminary reformer may be preheated so as to be fed thereto as steam or may be heated in the preliminary reformer to be thereby converted into steam. In the case of converting water into steam in advance before feeding the same, the raw fuel as well may be preheated, and a mixed gas of both the steam and preheated raw fuel may be guided into the preliminary reformer.

Figure 7:
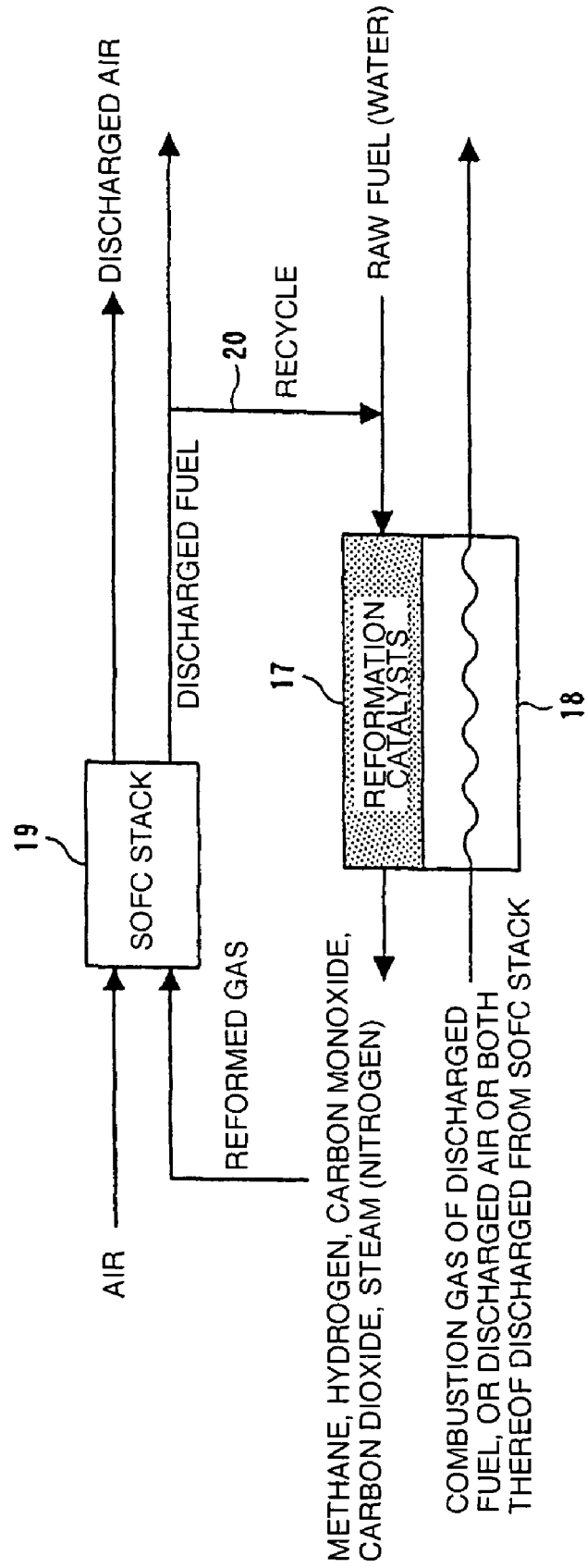
FIG. 7 is a schematic representation illustrating still another mode of the preliminary reformer employing the steam reforming process.

FIG. 7 is a schematic representation illustrating another mode of the preliminary reformer employing the steam reforming process, being a mode wherein the discharged air, and/or the discharged fuel, from the SOFC stack 19, or a combustion gas of both is utilized as a heating source, and a portion of the discharged fuel from the SOFC stack 19 is recycled through a branching-off pipe 20 to be mixed with the raw fuel fed to a preliminary reformer 17 so as to be heated. The preliminary reformer 17 is indirectly heated by a heat source in a heat exchanger 18. In this case, because the discharged fuel contains steam generated in the SOFC stack 19, the discharged fuel is also utilized as a steam source for use in preliminary reformation.

Figure 8:
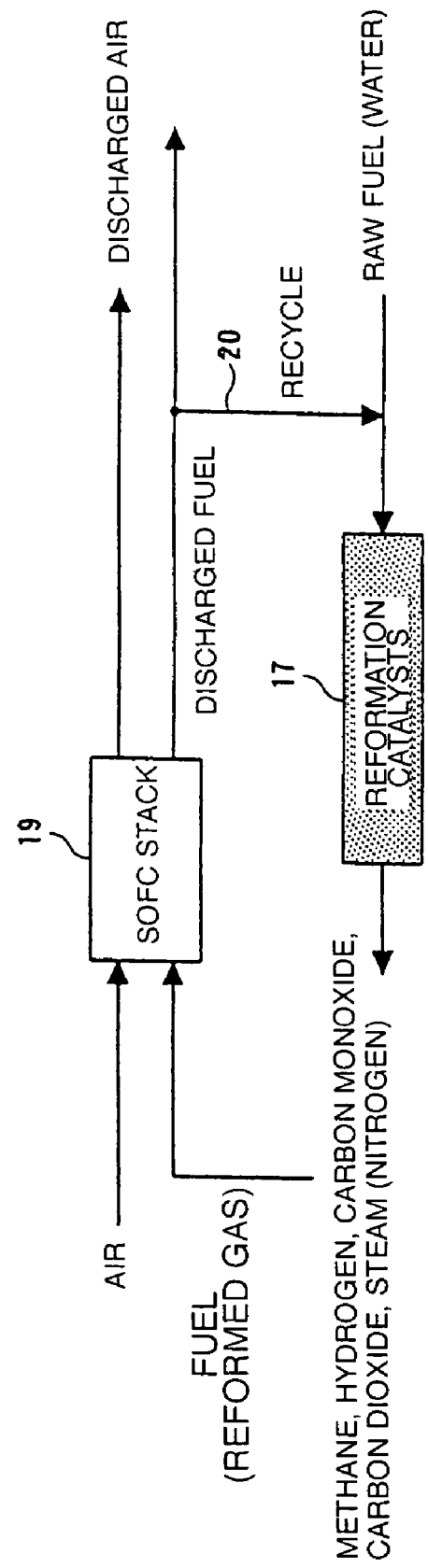
FIG. 8 is a schematic representation illustrating a further mode of the preliminary reformer employing the steam reforming process.

Since the discharged fuel is at a temperature approximately as high as the temperature of the SOFC stack 19, and in addition, the discharged fuel contains the steam generated in the SOFC stack 19, recycled discharged fuel alone can provide even a heat quantity as well as a steam quantity, required by the preliminary reformer 17. That is, by increasing a recycle ratio of the discharged fuel, the heat quantity and steam quantity, required for the reformation, can be adjusted. In such a mode, a separate heat source is unnecessary, so that a heat exchanger is not required. A mode in this case is shown in FIG. 8.

By disposing the present preliminary reformer in the vicinity of the SOFC stack disposed inside the adiabatic vessel, and within the adiabatic vessel, the heat thereof can be utilized efficiently and with ease.

Modes of the Preliminary Reformer Employing the Partial Combustion Process

With the preliminary reformer employing the partial combustion process, no heating is normally required because a partial oxidation reaction of the raw fuel is utilized, however, supplementary heating may be applied. In the case of an operation employing the partial combustion process, the preliminary reformer is operated at an air ratio $\lambda$ (a ratio of an actually-fed dry-air volume to a minimum air volume theoretically required for complete combustion of the raw fuel) less than 1.

FIGS. 9($a$), 9($b$), and 10 are schematic representations illustrating modes of the preliminary reformer employing the partial combustion process. Air together with the raw fuel are fed to a preliminary reformer 21 filled with reformation catalysts, and the air and the raw fuel are caused to react with each other, thereby forming a reformed gas from which the hydrocarbons having two or more carbon atoms have been removed. Since an operation according the partial combustion process is basically an exothermic reaction, there occurs a rise in temperature. Accordingly, heating is not essential although heating may be applied with a heating source. In place of the air, an oxygen-enriched air or oxygen may be used.

FIG. 9($a$) shows a mode in the case of applying no heating, and FIG. 9($b$) shows a mode in the case of applying heating. With the mode shown in FIG. 9($b$), the discharged air and/or the discharged fuel, from an SOFC stack, is utilized as a heating source. As the heating source, use may be made of a combustion gas of both, that is, a combustion gas formed by combusting the discharged fuel with the discharged air.

FIG. 10 is the schematic representation illustrating another mode wherein a portion of the discharged air from an SOFC stack 23 is recycled through a branching-off pipe 24 so as to be mixed with fuel to be reformed in a preliminary reformer 21 before being utilized. Thus, oxygen contained in the discharged air is utilized as oxygen for partial combustion. In this case, by increasing a recycle ratio of the discharged air, it is possible to eliminate the need for feeding fresh air.

As described in the foregoing, with the preliminary reformer according to the partial combustion process, there is a case where heating is required as well as a case where heating is not required, and in the case where heating is required, use is made of the discharged air, and/or the discharged fuel from the SOFC stack, or a combustion gas formed by combusting the discharged fuel with the discharged air as a heating source. By disposing the present preliminary reformer in the vicinity of the SOFC stack disposed inside an adiabatic vessel, and within the adiabatic vessel, heat thereof can be utilized efficiently and with ease.

Modes of the Integrated Heat Exchanger for Catalytic Combustion

The integrated heat exchanger for catalytic combustion, according to the invention is made up of a catalytic combustion layer for causing combustion of the discharged fuel from an SOFC with the discharged air, a first heat exchanger for utilizing a combustion gas formed in the catalytic combustion layer as a heat source, and a second heat exchanger, these component members being integrated with each other, wherein air and/or fuel (that is, either air or fuel, or both) is heated. Combustion catalysts are filled in, and disposed in the catalytic combustion layer while a combustion gas formed in the catalytic combustion layer is used as a heating source in the first heat exchanger.

There is no particular limitation to the combustion catalysts to be filled in the catalytic combustion layer provided that the same are catalysts capable of combusting the discharged fuel with the discharged air, and use is made of catalysts of a noble metal such as, for example, platinum, palladium, and so forth. These catalysts of the noble metal are used in such a form as supported by a carrier such as alumina and so forth. Further, there is no particular limitation to space velocity in the catalytic combustion layer, however, the space velocity may preferably be in a range of 1000 $h^{-1}$ to 60000 $h^{-1}$.

In addition, the discharged air, and/or the discharged fuel, from an SOFC, (that is, either the discharged air or the discharged fuel, or both) is used as a heating source of the second heat exchanger. In the second heat exchanger, use may be made of not necessarily the whole of the discharged air, and/or the discharged fuel, from the SOFC, but a portion thereof.

With the integrated heat exchanger for catalytic combustion, according to the invention, besides a case of heating the whole of the fuel and/or air, guided into the SOFC stack, a portion thereof, respectively, may be heated. The present integrated heat exchanger for catalytic combustion is used by disposing the same in the vicinity of the SOFC stack. Further, when using the present integrated heat exchanger for catalytic combustion in a SOFC system, the same together with the SOFC stack and the preliminary reformer are covered with a thermal insulating material or are housed in an adiabatic vessel to be thereby used.

With the present integrated heat exchanger, distribution of fluids to the first heat exchanger and the second heat exchanger, respectively, can be implemented in the following modes (1) and (2):

(1) The present integrated heat exchanger is configured such that the fuel and/or the air, guided into the SOFC stack, is first preheated in the first heat exchanger by use of the combustion gas formed by causing the combustion of the discharged fuel from the SOFC stack with the discharged air to occur in the catalytic combustion layer, and subsequently, the fuel and/or air is heated in the second heat exchanger with the discharged air, and/or the discharged fuel, from the SOFC stack before being fed to the SOFC stack.

(2) The present integrated heat exchanger is configured such that the fuel and/or air, guided into the SOFC stack, is first preheated in the second heat exchanger, and is subsequently heated in the first heat exchanger in the order reverse to that of the mode (1) as above. More specifically, the fuel and/or air, guided into the SOFC stack, is first preheated in the second heat exchanger with the discharged air, and/or the discharged fuel, from the SOFC stack, and is subsequently heated in the first heat exchanger by use of the combustion gas of the discharged air and the discharged fuel, from the SOFC stack, that is, the combustion gas formed by causing the combustion of the discharged fuel from the SOFC with the discharged air to occur in the catalytic combustion layer, before being fed to the SOFC stack.

FIGS. 11 to 18 are schematic representations illustrating configuration modes of the integrated heat exchanger for catalytic combustion, according to the invention, by way of example. FIGS. 11 to 14 each represents a case where the fuel and/or air, to be fed into the SOFC stack, is first preheated in the first heat exchanger, and is subsequently heated in the second heat exchanger before fed to the SOFC stack while FIGS. 15 to 18 each represents a case where the fuel and/or air, to be fed into the SOFC stack, is first preheated in the second heat exchanger, and is subsequently heated in the first heat exchanger before being fed to the SOFC stack.

In FIGS. 11 to 18, the first heat exchanger, the catalytic combustion layer, and the second heat exchanger are disposed in that order from the lower part to the upper part of an adiabatic vessel. However, the dispositional relationship among those component members can be varied such that, for example, ① the dispositional relationship thereof, shown in FIGS. 11 to 18, is vertically reversed, ② the first heat exchanger, and the second heat exchanger are disposed around the catalytic combustion layer as appropriate including a case where the first heat exchanger, and the second heat exchanger are disposed on respective sides of the catalytic combustion layer. Further, a multi-pipe type, coil type, flat plate type, double pipe type, etc. can be selected as appropriate for use as the first heat exchanger and second heat exchanger, respectively.

Figure 11:
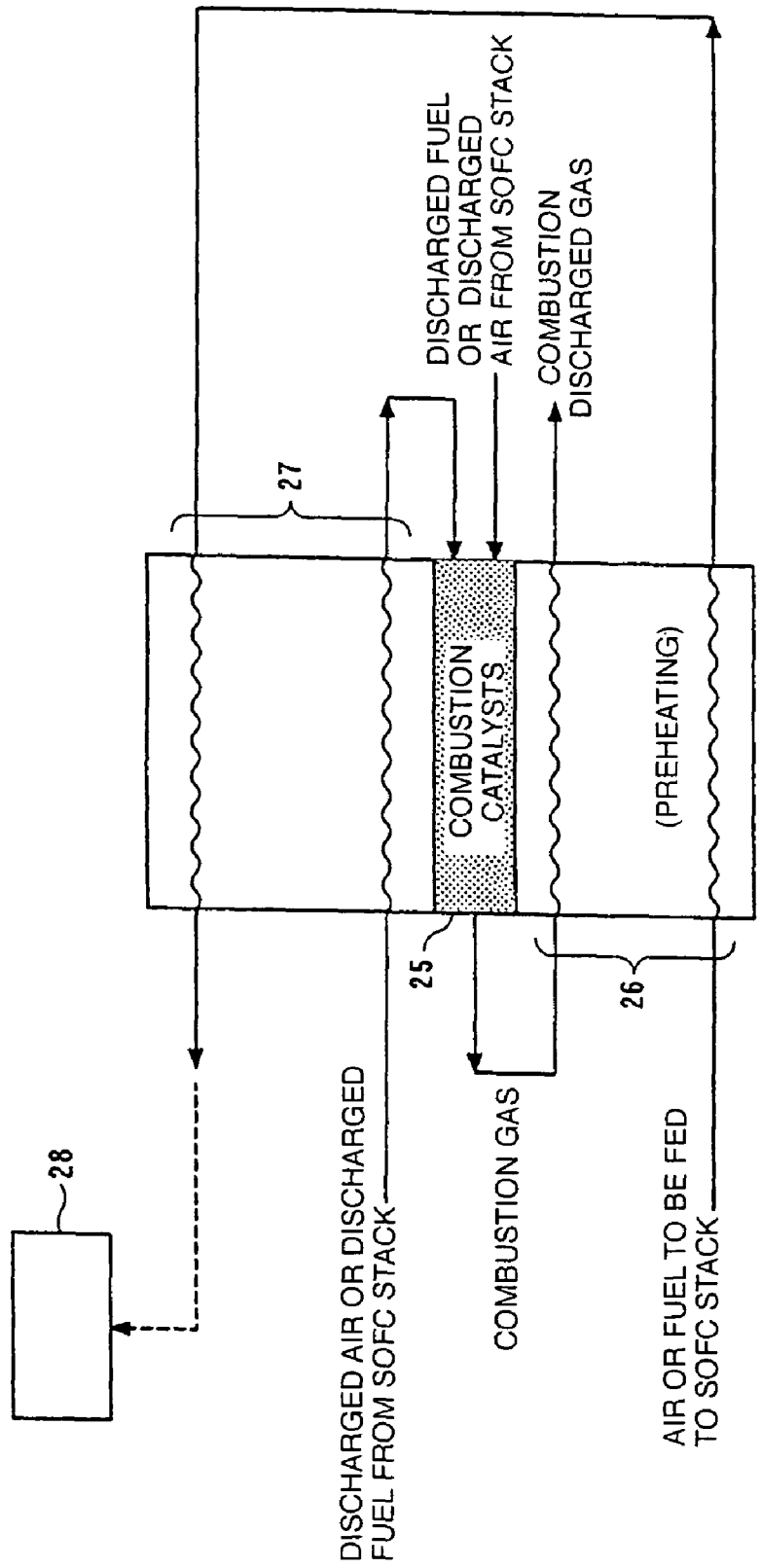
FIG. 11 is a schematic representation illustrating a configuration mode of an integrated heat exchanger for catalytic combustion, according to the invention.

The mode shown in FIG. 11 represents a case of preheating the air or fuel. Discharged air or discharged fuel from an SOFC stack 28 are subjected to combustion in a catalytic combustion layer 25. The air or fuel to be fed to the SOFC stack 28 is first preheated in a first heat exchanger 26 through indirect heat exchange with a combustion gas formed in the catalytic combustion layer 25. This mode is configured such that the air or fuel is subsequently heated in a second heat exchanger 27 through indirect heat exchange with the discharged air or the discharged fuel before being fed to the SOFC stack 28. In the case of a heating source in the second heat exchanger being the discharged air, the discharged air passing through the second heat exchanger together with the discharged fuel from the SOFC stack 28 are fed to the catalytic combustion layer 25 while in the case of a heating source in the second heat exchanger being the discharged fuel, the discharged fuel passing through the second heat exchanger together with the discharged air from the SOFC stack 28 are fed to the catalytic combustion layer 25.

Figure 12:
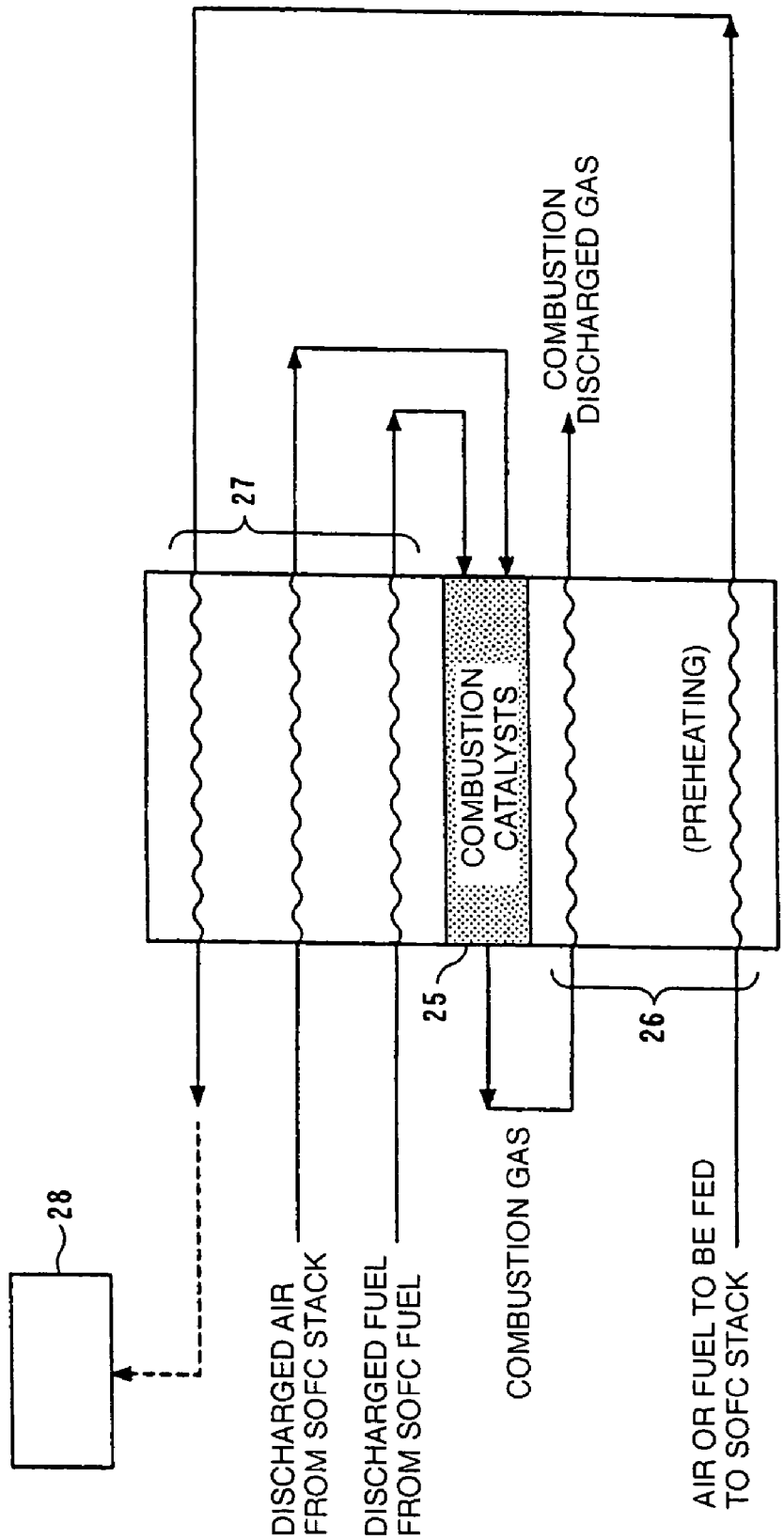
FIG. 12 is a schematic representation illustrating another configuration mode of the integrated heat exchanger for catalytic combustion, according to the invention.

The mode shown in FIG. 12 represents a case of preheating the air or fuel as with the mode shown in FIG. 11, but differs from the latter in that both the discharged air and discharged fuel are utilized as a heat source of a second heat exchanger 27. The air or fuel to be fed to an SOFC stack 28 is first preheated in a first heat exchanger 26 through indirect heat exchange with a combustion gas formed in a catalytic combustion layer, 25. This mode is configured such that the air or fuel is subsequently heated in the second heat exchanger 27 through indirect heat exchange with the discharged air and discharged fuel before being fed to the SOFC stack 28. The discharged air and discharged fuel are utilized as a heating source of the second heat exchanger, and both are thereafter fed to the catalytic combustion layer 25.

Figure 13:
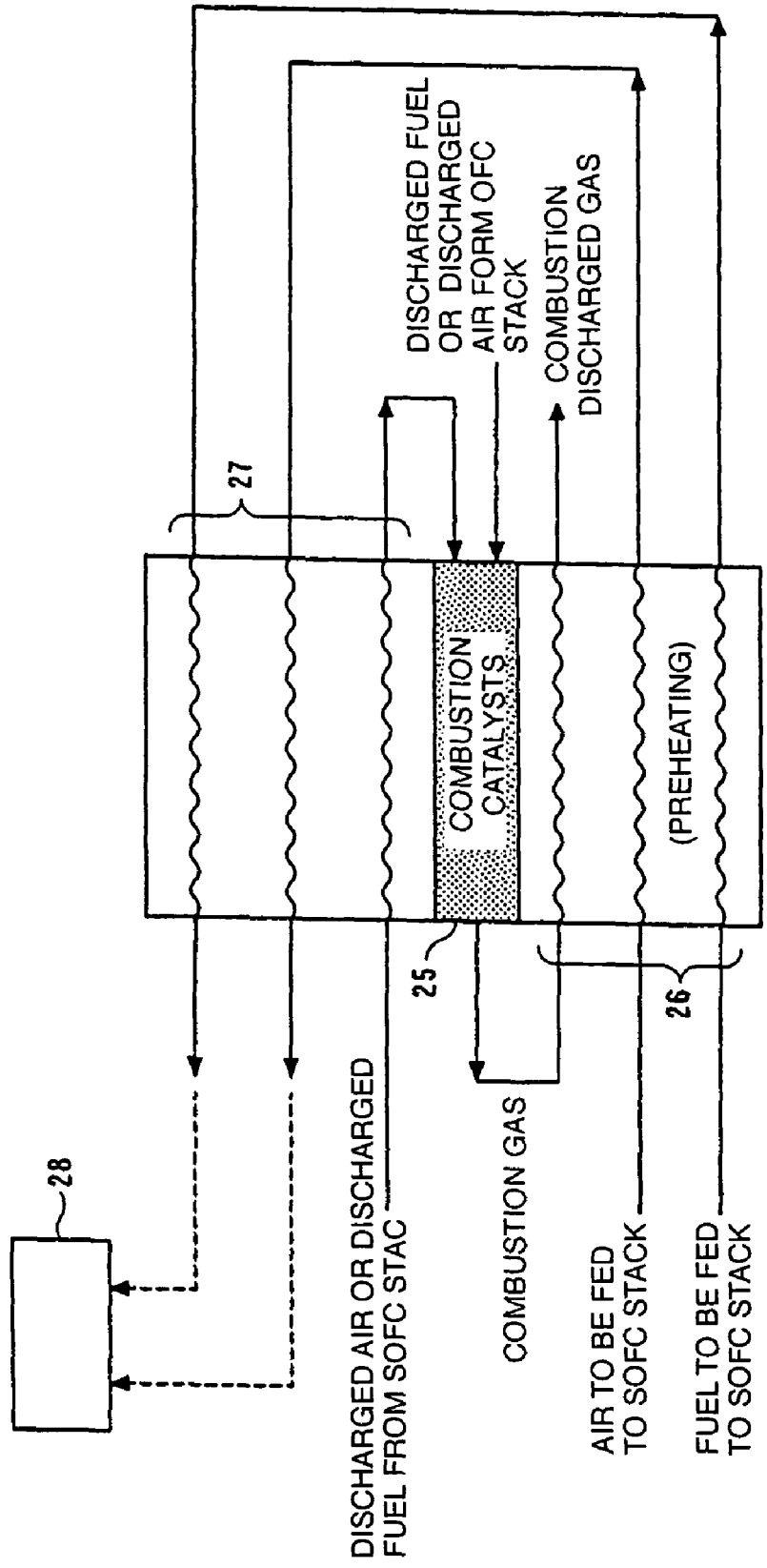
FIG. 13 is a schematic representation illustrating still another configuration mode of the integrated heat exchanger for catalytic combustion, according to the invention.

The mode shown in FIG. 13 represents a case of preheating both the air and fuel. The discharged air and discharged fuel from an SOFC stack 28 are subjected to combustion in a catalytic combustion layer 25. The air and fuel to be fed to the SOFC stack 28 are first preheated in a first heat exchanger 26 through indirect heat exchange with a combustion gas formed in the catalytic combustion layer 25. This mode is configured such that the air and fuel are subsequently heated in a second heat exchanger 27 through indirect heat exchange with the discharged air or the discharged fuel before being fed to the SOFC stack 28. In the case of a heating source in the second heat exchanger being the discharged air, the discharged air passing through the second heat exchanger together with the discharged fuel from the SOFC stack 28 are fed to the catalytic combustion layer 25 while in the case of a heating source in the second heat exchanger being the discharged fuel, the discharged fuel passing through the second heat exchanger together with the discharged air from the SOFC stack 28 are fed to the catalytic combustion layer 25.

Figure 14:
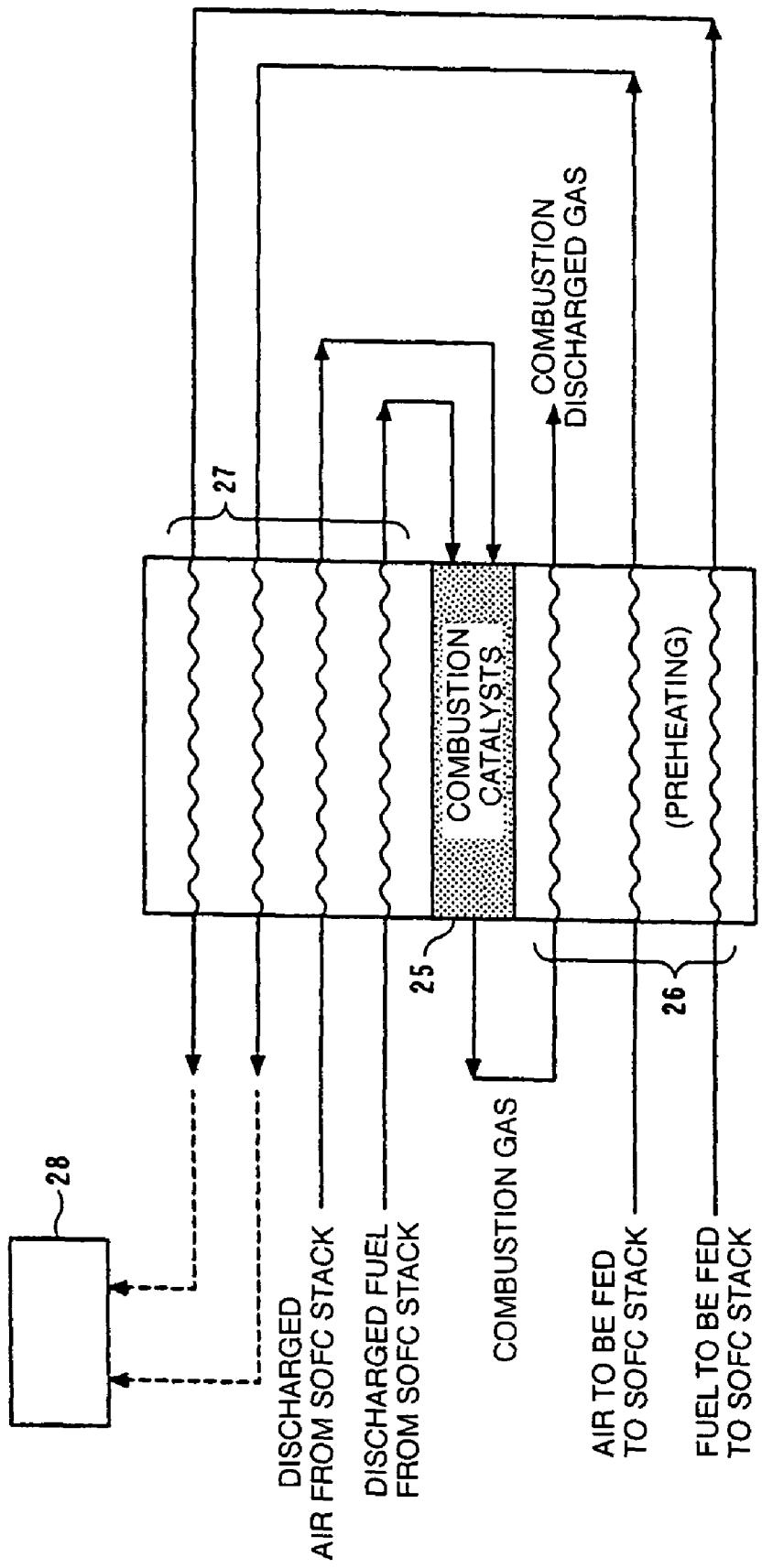
FIG. 14 is a schematic representation illustrating a further configuration mode of the integrated heat exchanger for catalytic combustion, according to the invention.

The mode shown in FIG. 14 represents a case of heating both the air and fuel as with the preceding mode, but differs from the mode shown in FIG. 13 in that both the discharged air and discharged fuel are utilized as a heat source of a second heat exchanger 27. The air and fuel to be fed to an SOFC stack 28 are first preheated in a first heat exchanger 26 through indirect heat exchange with a combustion gas formed in a catalytic combustion layer 25. This mode is configured such that the air and fuel are subsequently heated in the second heat exchanger 27 through indirect heat exchange with the discharged air and discharged fuel before being fed to the SOFC stack 28. The discharged air and discharged fuel are utilized as a heating source of the second heat exchanger, and both are thereafter fed to the catalytic combustion layer 25.

As described above, with the modes shown in FIGS. 11 to 14, respectively, since the heating source of the second heat exchanger is either the discharged air or the discharged fuel from the SOFC stack, or both, the heating source is at a temperature equivalent to an operational temperature of the SOFC stack, so that the air and/or fuel heated by the heating source is at a temperature close to the operational temperature of the SOFC stack when fed to the SOFC stack.

FIGS. 15 to 18 represent modes wherein the air and/or fuel, to be fed into the SOFC stack, is first preheated in a second heat exchanger, and is subsequently heated in a first heat exchanger before being fed to the SOFC stack.

Figure 15:
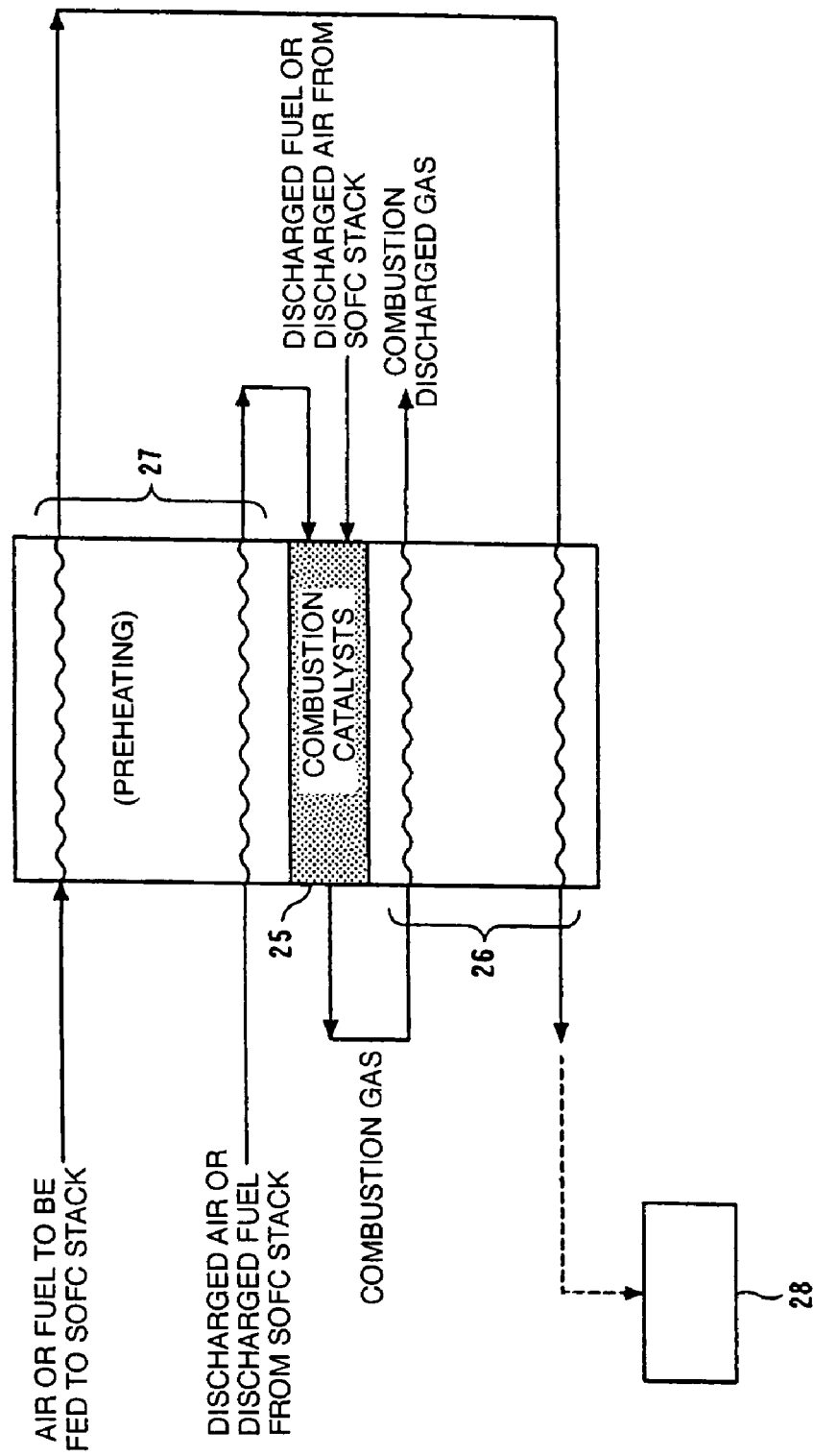
FIG. 15 is a schematic representation illustrating a still further configuration mode of the integrated heat exchanger for catalytic combustion, according to the invention.

In the case of the mode shown in FIG. 15, the air or fuel to be fed to an SOFC stack is first preheated in the second heat exchanger through indirect heat exchange with the discharged air or discharged fuel from the SOFC stack. This mode is configured such that the air or fuel is subsequently heated in the first heat exchanger through indirect heat exchange with a combustion gas formed in a catalytic combustion layer before being fed to the SOFC stack.

Figure 16:
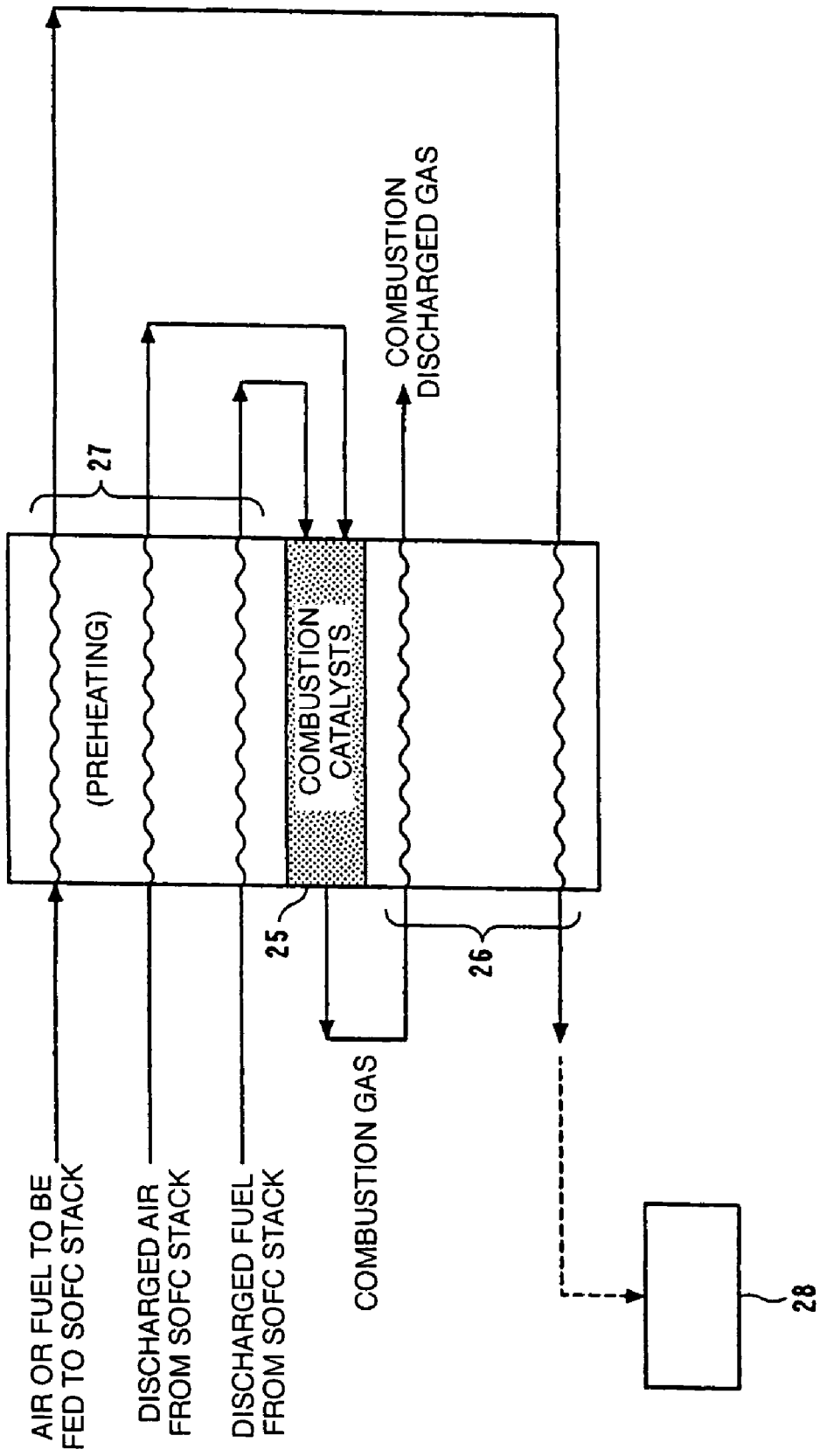
FIG. 16 is a schematic representation illustrating a yet further configuration mode of the integrated heat exchanger for catalytic combustion, according to the invention.

In the case of the mode shown in FIG. 16, the air or fuel to be fed to an SOFC stack is first preheated in a second heat exchanger through indirect heat exchange with the discharged air and discharged fuel from the SOFC stack. This mode is configured such that the air or fuel is subsequently heated in a first heat exchanger through indirect heat exchange with a combustion gas formed in a catalytic combustion layer before being fed to the SOFC stack.

Figure 17:
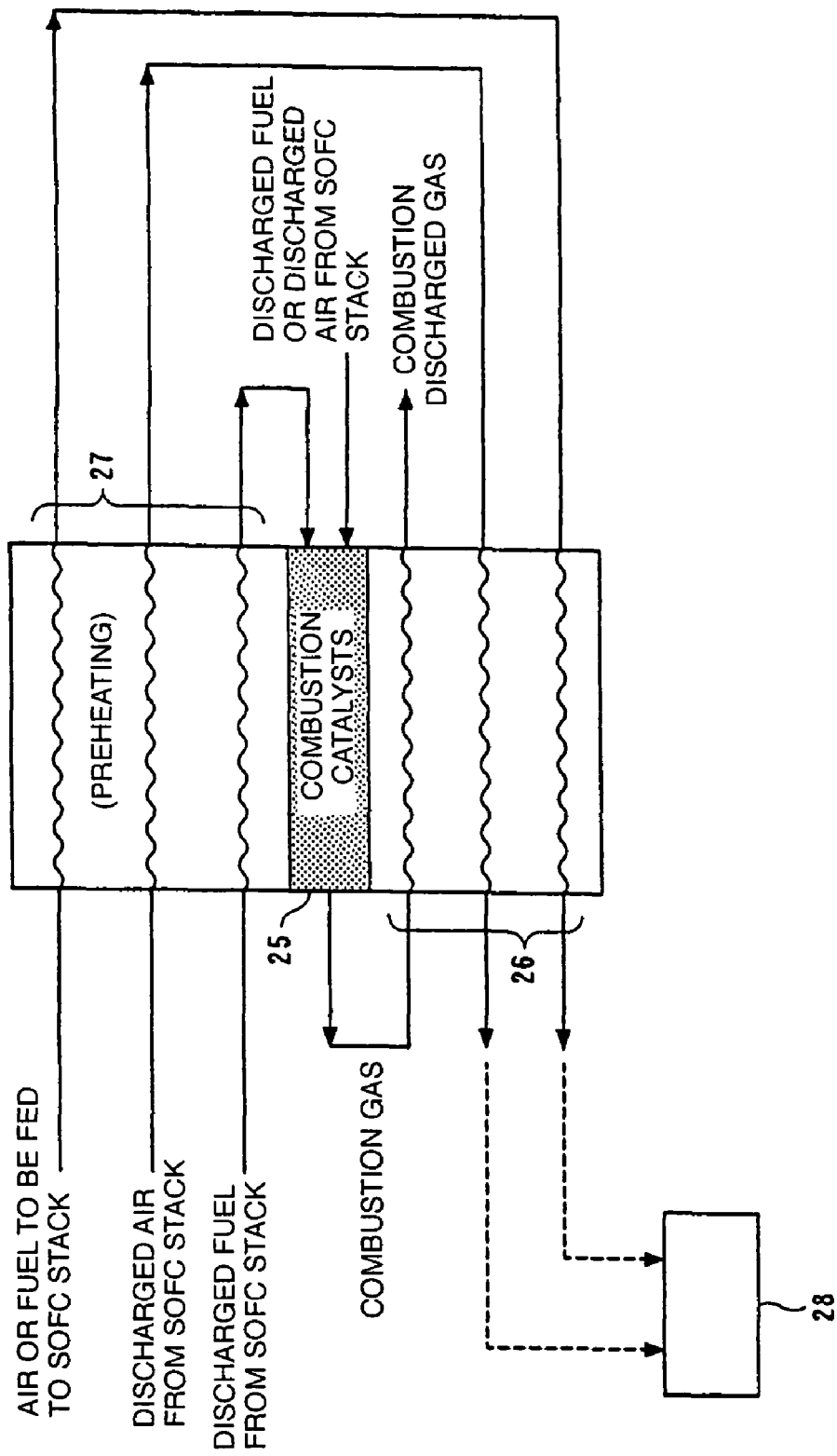
FIG. 17 is a schematic representation illustrating another configuration mode of the integrated heat exchanger for catalytic combustion, according to the invention.

In the case of the mode shown in FIG. 17, the air and fuel to be fed to an SOFC stack are first preheated in a second heat exchanger through indirect heat exchange with the discharged air or discharged fuel from the SOFC stack. This mode is configured such that the air and fuel are subsequently heated in a first heat exchanger through indirect heat exchange with a combustion gas formed in a catalytic combustion layer before being fed to the SOFC stack.

Figure 18:
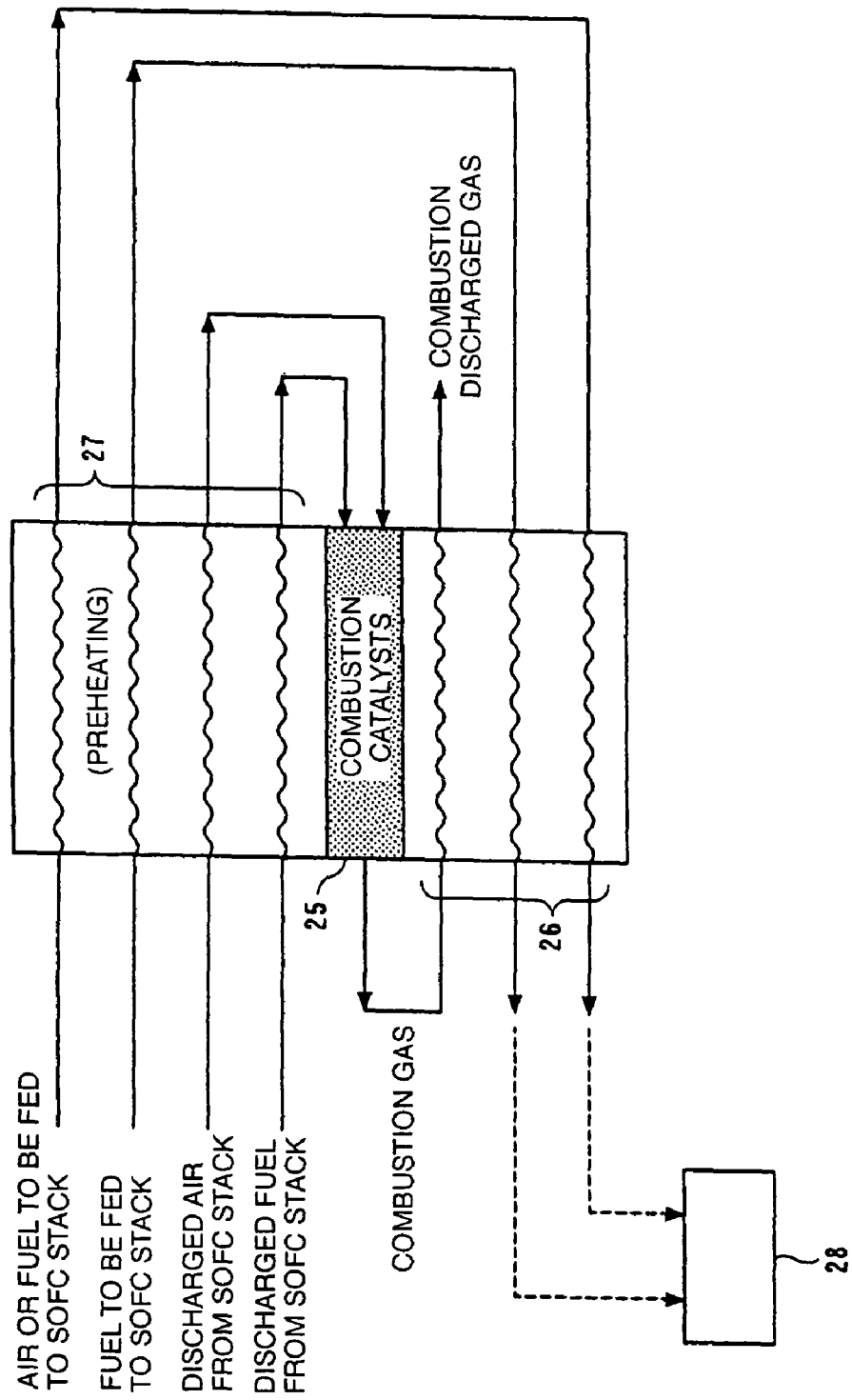
FIG. 18 is a schematic representation illustrating still another configuration mode of the integrated heat exchanger for catalytic combustion, according to the invention.

In the case of the mode shown in FIG. 18, the air and fuel to be fed to an SOFC stack are first preheated in a second heat exchanger through indirect heat exchange with the discharged air and discharged fuel from the SOFC stack. This mode is configured such that the air and fuel are subsequently heated in a first heat exchanger through indirect heat exchange with a combustion gas formed in a catalytic combustion layer before being fed to the SOFC stack.

As described above, with the modes shown in FIGS. 15 to 18, respectively, as well, the heating source of the first heat exchanger is the combustion gas formed in the catalytic combustion layer as with the case of the modes shown in FIGS. 11 to 14, respectively, so that the air and/or fuel heated by the heating source is at a temperature close to the operational temperature of the SOFC stack when the same is fed to the SOFC stack.

With the integrated heat exchanger for catalytic combustion, according to the invention, by causing the discharged fuel from the SOFC to undergo combustion with the discharged air in the catalytic combustion layer, and by utilizing the combustion heat generated therefrom, the air or fuel or both thereof, to be fed to the SOFC stack, are heated, thereby enabling the maximum temperature achieved at the time of operating the SOFC stack to be controlled not higher than on the order of 820° C. As a result, for constituent materials for not only the integrated heat exchanger itself for catalytic combustion but also the SOFC stack, preliminary reformer, piping, and so forth, use of such expensive material as that required for the self-supporting membrane type SOFC is rendered unnecessary, so that use can be made of an inexpensive material such as, for example, stainless steel. In addition, the thermal insulating material of the adiabatic vessel for housing those component members can be reduced in thickness, and the SOFC system on the whole can be reduced in size.

Further, the integrated heat exchanger for catalytic combustion, according to the invention, is used in the supported membrane type SOFC, in particular. More specifically, the operational temperature of the supported membrane type SOFC is in a range of 650° C. to 850° C., for example, 750° C. and with the present integrated heat exchanger for catalytic combustion, the maximum temperature reached at the time of operating the SOFC stack can be controlled to be not higher than on the order of 820° C., so that the present integrated heat exchanger for catalytic combustion is suitable for use in the supported membrane type SOFC. Further, the present integrated heat exchanger for catalytic combustion can be used in the self-supporting membrane type SOFC as well provided that the same can be operated at a temperature on the order of 850° C., or lower.

Modes of the Solid Oxide Fuel Cell System

The solid oxide fuel cell system according to the invention is made up by housing and assembling the preliminary reformer and the integrated heat exchanger for catalytic combustion, described above, together with the SOFC stack, including piping interconnecting those component members, and so forth, in the adiabatic vessel. For the thermal insulating material of the adiabatic vessel, use is made of glass wool, slag wool, various refractory and other materials as appropriate. FIGS. 19 to 22 are schematic representations illustrating configuration modes of the system according to the invention, respectively, by way of example.

Figure 19:
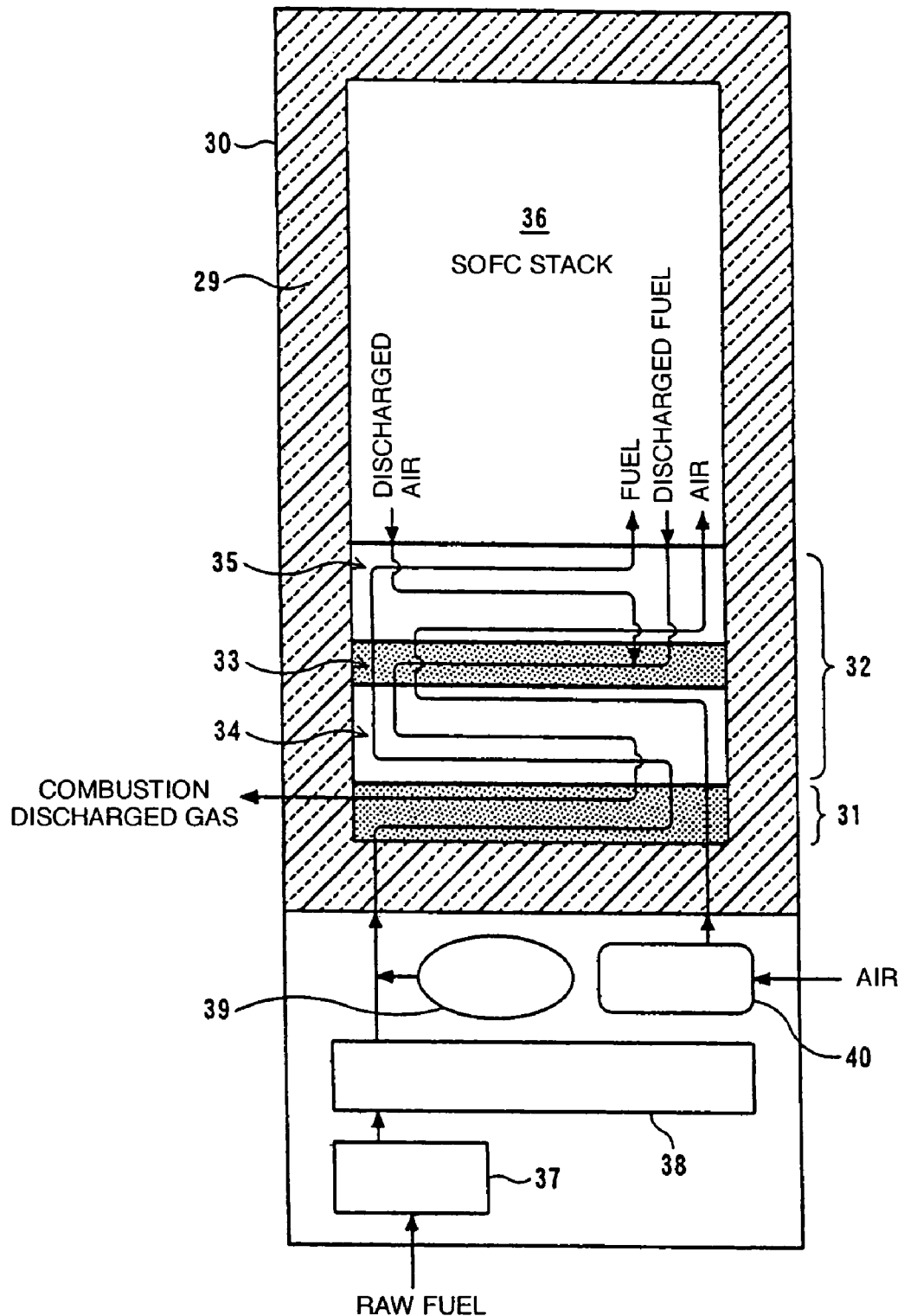
FIG. 19 is a schematic representation illustrating a mode of an SOFC system according to the invention.

FIG. 19 is the schematic representation illustrating the mode of the system, wherein an SOFC stack 36, a preliminary reformer 31 and an integrated heat exchanger 32 for catalytic combustion are assembled in an adiabatic vessel 30 made up with a thermal insulating material 29 disposed around it. The preliminary reformer 31, the integrated heat exchanger 32 for catalytic combustion, and the SOFC stack 36 are assembled inside the adiabatic vessel 30 in sequence from the lower part to the upper part thereof. The integrated heat exchanger 32 for catalytic combustion comprises a catalytic combustion layer 33, first heat exchanger 34, and second heat exchanger 35. A combustion gas formed by causing combustion of the discharged fuel and discharged air, from the SOFC stack 36, to occur in the catalytic combustion layer 33 is used as a heating source of the preliminary reformer 31 after utilizing the same for preheating a reformed gas from the preliminary reformer 31.

The discharged fuel and discharged air are fed to the catalytic combustion layer 33, and both are mixed with each other therein to be combusted, whereupon a combustion gas formed is utilized as a heating source of the first heat exchanger 34, and the preliminary reformer 31 succeeding thereto, respectively. The catalytic combustion layer 33 is filled with combustion catalysts, and the discharged fuel and discharged air are directly guided to the combustion catalysts to be mixed therewith to undergo combustion. A combustion gas passes through the combustion catalysts in the catalytic combustion layer 33, and is fed to the first heat exchanger 34 although flow of the combustion gas is indicated by a duct line in FIG. 19 for the sake of convenience.

Figure 20:
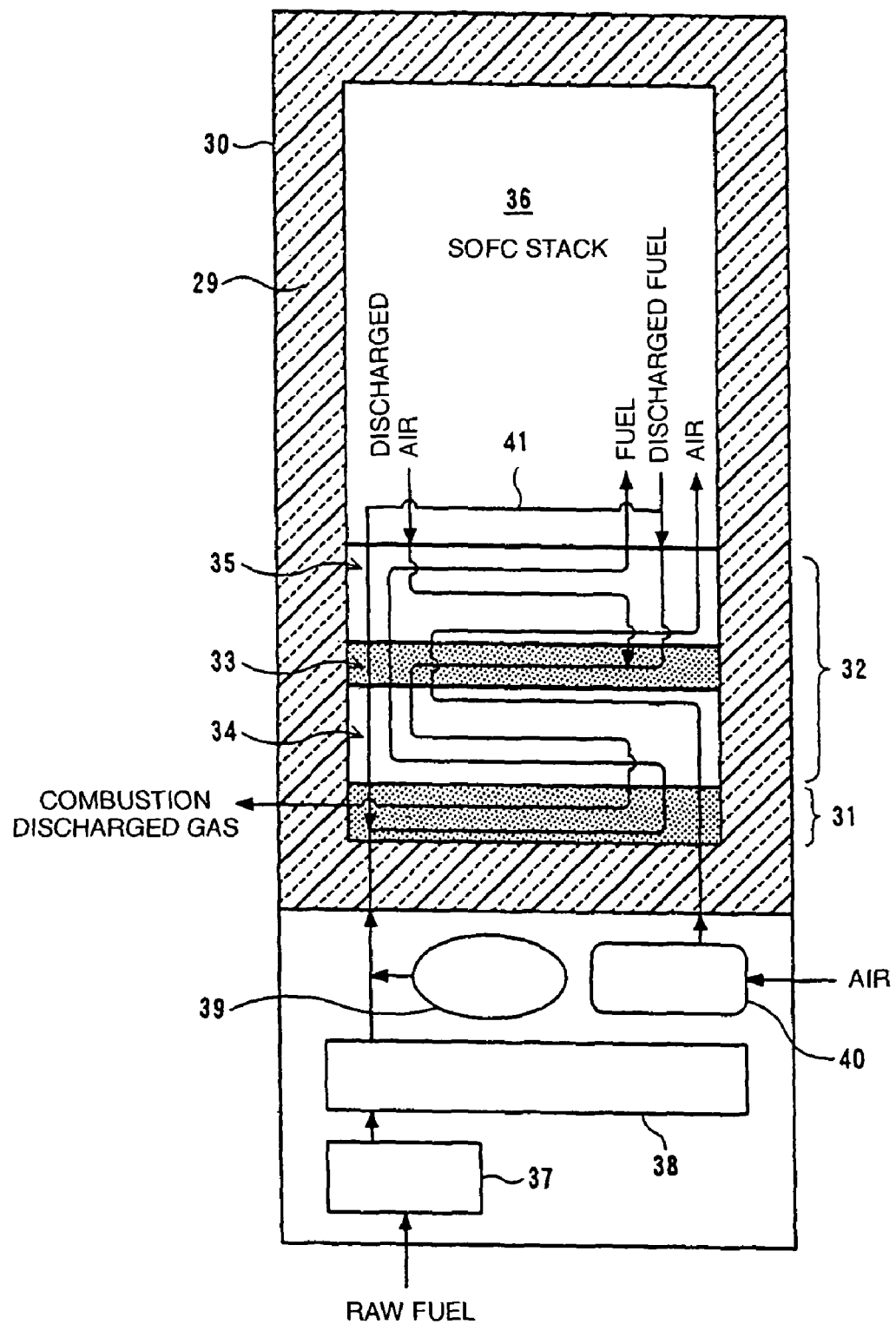
FIG. 20 is a schematic representation illustrating another mode of the SOFC system according to the invention.
Figure 21:
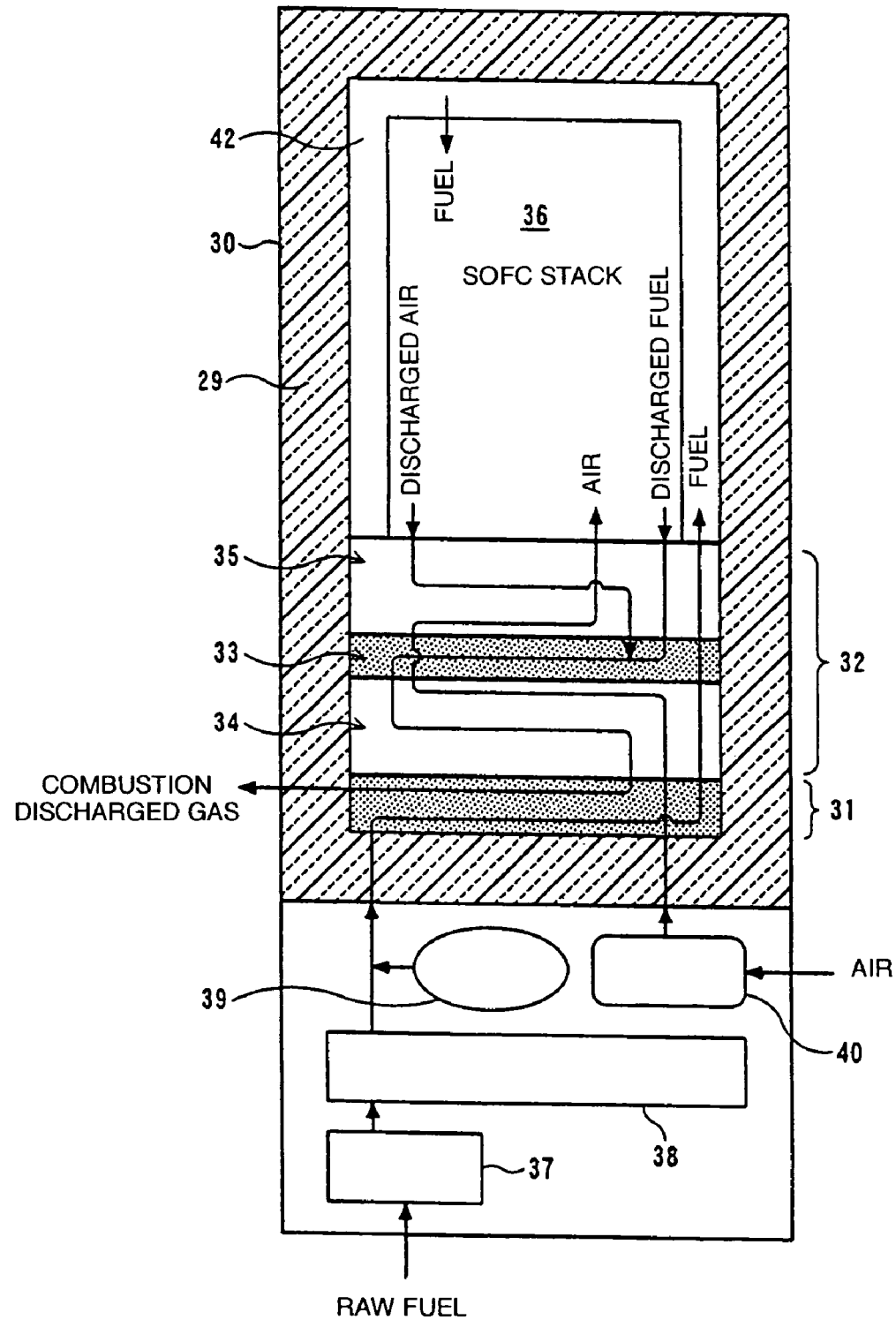
FIG. 21 is a schematic representation illustrating still another mode of the SOFC system according to the invention.
Figure 22:
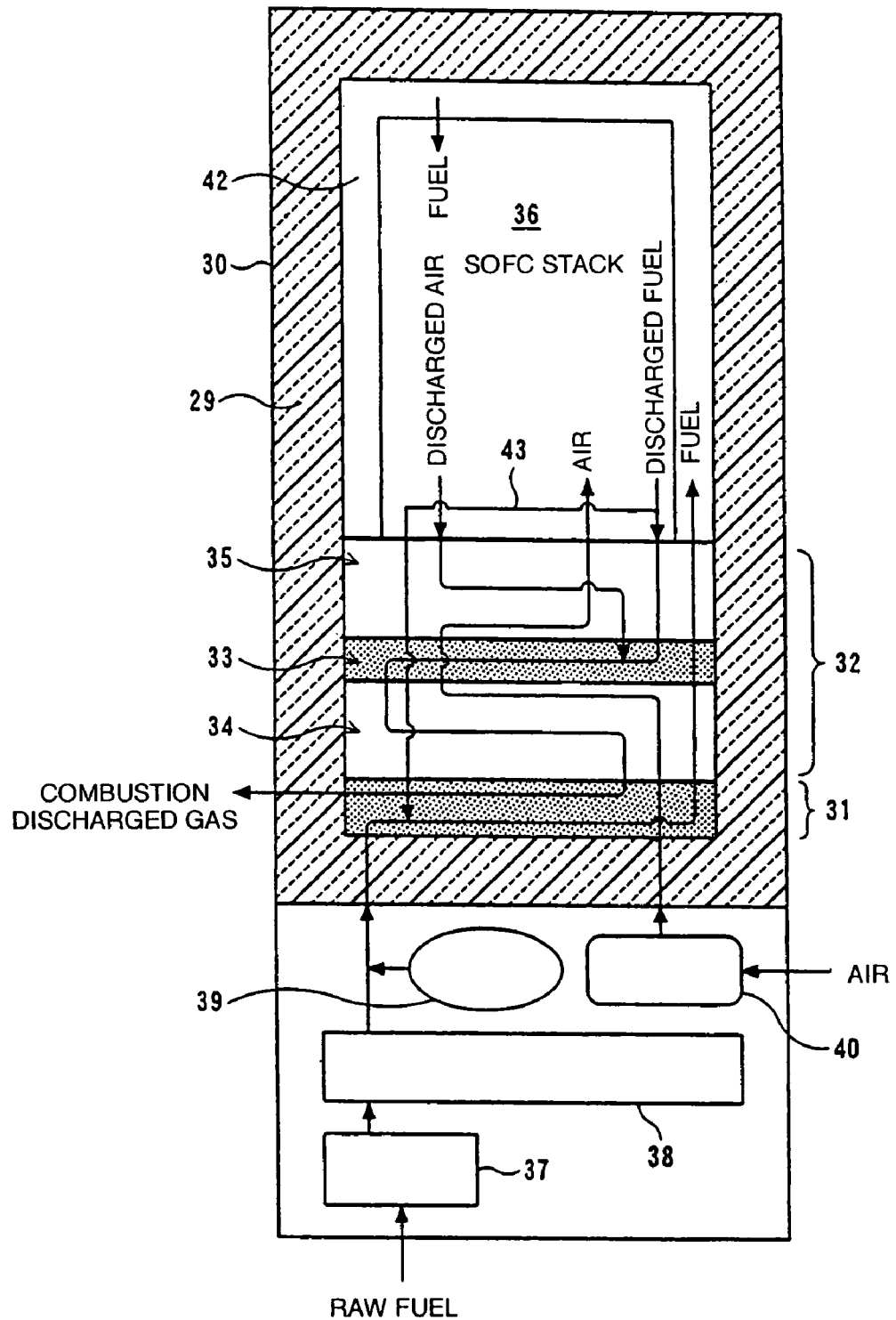
FIG. 22 is a schematic representation illustrating a further mode of the SOFC system according to the invention.

In the first heat exchanger 34, air and the fuel (that is, the reformed gas) reformed in the preliminary reformer 31 are indirectly heated by the combustion gas. In the preliminary reformer 31, raw fuel containing water mixed therein is indirectly heated by the combustion gas to be thereby reformed. The modes described hereinafter with reference to FIGS. 20 to 22 are the same as the present mode in that heating applied in the first heat exchanger 34 as well as the preliminary reformer 31 is indirect heating. The combustion gas passing through the first heat exchanger 34 and the preliminary reformer 31 is discharged as a combustion off-gas.

Reference numeral 37 denotes a raw fuel blower, 38 a desulfurizer, 39 a pure water tank, and 40 an air blower. If the fuel contains a sulfur compound, this will cause the fuel electrodes of the SOFC stack to undergo poisoning, so that the fuel is fed to the preliminary reformer 31 after desulfurization by the desulfurizer 38. If the fuel contains no sulfur compound or any sulfur compound has already been removed therefrom, the desulfurizer 38 is not required. The modes described hereinafter with reference to FIGS. 20 to 22 are the same as the present mode in this respect.

Raw fuel is transferred through the raw fuel blower 37, and the desulfurizer 38 (if necessary) to be mixed with water from the pure water tank 39, and is directly fed to reformation catalysts in the preliminary reformer 31, thereby undergoing reformation upon coming into direct contact with the reformation catalysts. In FIG. 19, flows of the raw fuel, water, and reformed gas as formed in the reformation catalysts, respectively, are indicated by duct lines for the sake of convenience. The modes described hereinafter with reference to FIGS. 20 to 22 are the same as the present mode in this respect. The fuel after being reformed and discharged from the preliminary reformer 31, is heated sequentially in the first heat exchanger 34, and second heat exchanger 35 to be thereby guided to the fuel electrodes of the SOFC stack.

FIG. 20 represents a case of recycling a portion of the discharged fuel from the SOFC stack for reuse as fuel. In this case, a portion of the discharged fuel from an SOFC stack 36 is caused to branch off into a duct line 41 and is mixed with the raw fuel fed to a preliminary reformer 31 to be thereby reused. The remainder of the discharged fuel, not recycled, is caused to undergo combustion with the discharged air in a catalytic combustion layer 33. Then, fuel (a reformed gas), after being reformed in a preliminary reformer 31, is heated by a combustion gas formed in a first heat exchanger 34. The combustion gas formed may be used for preheating air delivered from an air blower 40, which case is shown in FIG. 20. The air as preheated therein is further heated in a second heat exchanger 35 by the discharged air before being fed to the SOFC stack 36.

FIG. 21 represents a case of heating fuel, to be fed to an SOFC stack 36, on the periphery (around) 42 thereof. The fuel reformed in a preliminary reformer 31 is heated by a combustion gas delivered from a catalytic combustion layer 33, and is further heated on the periphery 42 of the SOFC stack 36 before being fed to the SOFC stack 36. In this case, the fuel leaving the preliminary reformer 31 may be subsequently fed to the periphery 42 of the SOFC stack 36 without passing through an integrated heat exchanger 32 for catalytic combustion. The mode described hereinafter with reference to FIG. 22 is the same as the present mode in this respect.

The heating of the fuel on the periphery 42 of the SOFC stack 36 is executed by an appropriate method such as (1) a method of circulating the fuel in a space between the SOFC stack 36 and an adiabatic vessel 30, (2) a method of disposing a tubular duct line in a space between the SOFC stack 36 and the adiabatic vessel 30 to thereby circulate the fuel in the tubular duct line, and so forth. Air is preheated in a first heat exchanger 34 by the combustion gas delivered from the catalytic combustion layer, and subsequently, is further heated in a second heat exchanger 35 by the discharged air before being fed to the SOFC stack 36.

Instead of heating the fuel on the periphery 42 of the SOFC stack 36, the air may be heated on the periphery 42 of the SOFC stack 36. In this case, the air may be fed from an air blower 40 directly to the periphery 42 of the SOFC stack 36. The mode described hereinafter with reference to FIG. 22 is the same as the present mode in this respect.

A mode shown in FIG. 22 is similar to that shown in FIG. 21 in that fuel fed to an SOFC stack 36 is heated on the periphery (around) 42 of the SOFC stack 36, but differs from the latter in that a portion of the discharged fuel from an SOFC stack is recycled for reuse as fuel. In this case, a portion of the discharged fuel from the SOFC stack 36 is caused to branch off into a recycle duct line 43 and is mixed with the raw fuel fed to a preliminary reformer 31 to be thereby reused. The remainder of the discharged fuel, not recycled, is caused to undergo combustion with the discharged air in a catalytic combustion layer 33. Then, air is preheated (heated) in a first heat exchanger 34 by a combustion gas formed. The combustion gas formed may be used for preheating of the fuel reformed in the preliminary reformer 31.

The dispositional relationship among the SOFC stack, the preliminary reformer, and the integrated heat exchanger for catalytic combustion, inside an adiabatic vessel, is not limited to that for the modes shown in FIGS. 19 to 22, respectively, and other dispositional relationships as appropriate can be adopted, including, for example, (1) a case where the SOFC stack is disposed in the lower part of the adiabatic vessel, and on top of the SOFC stack, there are sequentially disposed the integrated heat exchanger for catalytic combustion, and the preliminary reformer, (2) a case where the SOFC stack is disposed in the middle part of the adiabatic vessel, and the integrated heat exchanger for catalytic combustion is disposed underneath the SOFC stack while the preliminary reformer is disposed on top of the SOFC stack, and (3) a case where the SOFC stack is disposed in the middle part of the adiabatic vessel, and the preliminary reformer is disposed underneath the SOFC stack while the integrated heat exchanger for catalytic combustion is disposed on top of the SOFC stack. Furthermore, as for the integrated heat exchanger itself for catalytic combustion, there can be adopted a different disposition relation as appropriate, including, for example, a case where the first heat exchanger is disposed on one side of the SOFC stack.

EMBODIMENTS

The invention is described in further detail hereinafter with reference to embodiments thereof, however, it is to be pointed out that the invention is obviously not limited thereto. Further, in figures associated with the embodiments, valves or the like as appropriate are disposed in respective pipes of various fluids, and a temperature detection sensor is disposed at respective spots as required in accordance with the common practice, however, description thereof is omitted in the figures associated with the embodiments.

Embodiment 1

Figure 23:
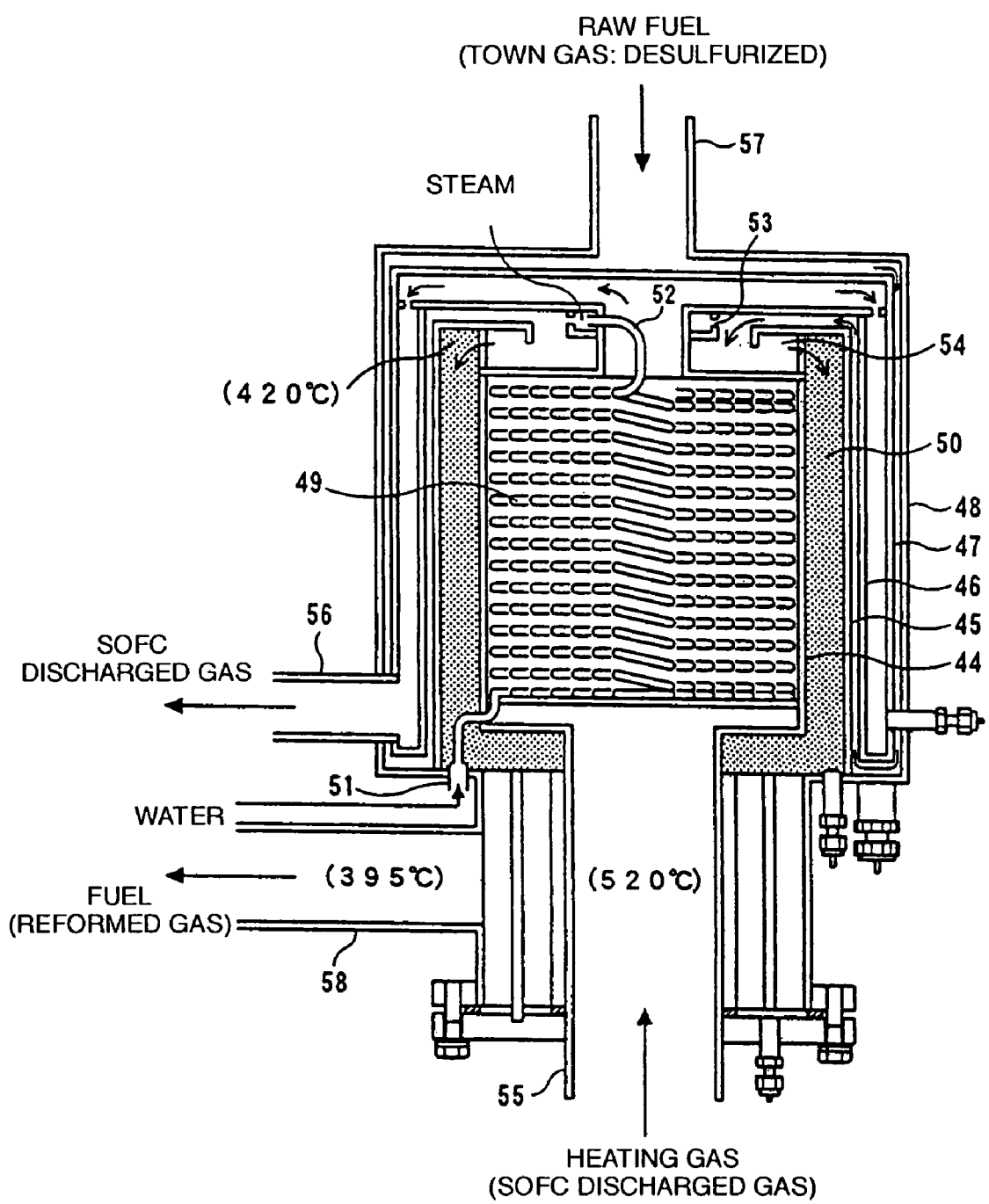
FIG. 23 is a schematic view showing a configuration of the preliminary reformer used in the SOFC system according to Embodiment 1 and 2, respectively.

FIG. 23 is a longitudinal sectional view showing a configuration of a preliminary reformer by way of example. The present preliminary reformer corresponds to the preliminary reformer in the case where water is heated in the preliminary reformer to be thereby turned into the steam in the modes shown in FIGS. 5 to 7, respectively. In FIG. 23, the arrows indicate respective flow directions of fluids.

As shown in FIG. 23, cylinders 44, 45, 46, 47, 48, sequentially increasing in diameter, were disposed in multiple layers with spacing in-between. A heat exchanger (water heater) was built inside the innermost cylinder 44 in which a tubular heat exchange tube 49 is disposed so as to form a coil. A reformation catalyst layer 50 was made up between the cylinder 44 surrounding the heat exchanger and the cylinder 45, and the reformation catalyst layer 50 was filled up with reformation catalysts for preliminary reformation. Reference numeral 51 denotes a water inlet conduit, and water guided therethrough passes through the heat exchange tube 49 to be heated therein, thereby being turned into steam. The steam was guided from a water outlet conduit 52 to the reformation catalyst layer 50 via a steam circulation hole 53, and a mixing chamber (mixture part) 54. Reference numeral 55 is an inlet pipe for a heating gas. For the heating gas, use was made of discharged air or discharged fuel, from an SOFC stack, or a combustion gas formed by combusting the discharged fuel with the discharged air (that is, the combustion gas of the discharged fuel and discharged air). The heating gas was circulated around the periphery of the heat exchange tube 49 in the heat exchanger to thereby indirectly heat the water flowing in the heat exchange tube 49, and was subsequently turned back in the upper part of the preliminary reformer so as to be circulated downward in a space between the cylinders 46, 47, before being discharged from a discharge pipe 56. Reference numeral 57 denotes an inlet pipe for raw fuel. The raw fuel fed from the inlet pipe 57 was circulated downward in a space between the cylinders 47, 48 as indicated by the arrow in FIG. 23, and is subsequently turned back in the lower part of the preliminary reformer so as to be circulated upward in a space between the cylinders 45, 46, before being mixed with the steam in the mixing chamber (mixture part) 54. A mixed gas was guided into the reformation catalyst layer 50 wherein the raw fuel was reformed with the steam. That is, hydrocarbons having two or more carbon atoms, contained in the raw fuel, was reformed to be thereby converted into methane, that is, a hydrocarbon having one carbon atom, hydrogen, carbon monoxide and carbon dioxide, thus resulting in the formation of fuel (a reformed gas) without containing hydrocarbons having two or more carbon atoms. The reformed gas was discharged from a discharge pipe 58 to be guided to fuel electrodes of an SOFC stack. A lid was disposed at the upper part and lower part of the respective cylinders so as to closely correspond to respective vertical circulation paths of the fluids, thereby forming respective flow paths.

All component members of the preliminary reformer constructed as above were made of stainless steel: SUS 310S (JIS standard), and for the reformation catalysts in the reformation catalyst layer 50, use was made of Ni/Al$_2$O$_3$ catalysts (Ni catalysts with alumina as a carrier: spherical in shape (average dia.=around 2 mm), and with addition of 5 mol % of La). A weight ratio of Ni to Al$_2$O$_3$ is 50:50.

Embodiment 2

Figure 24:
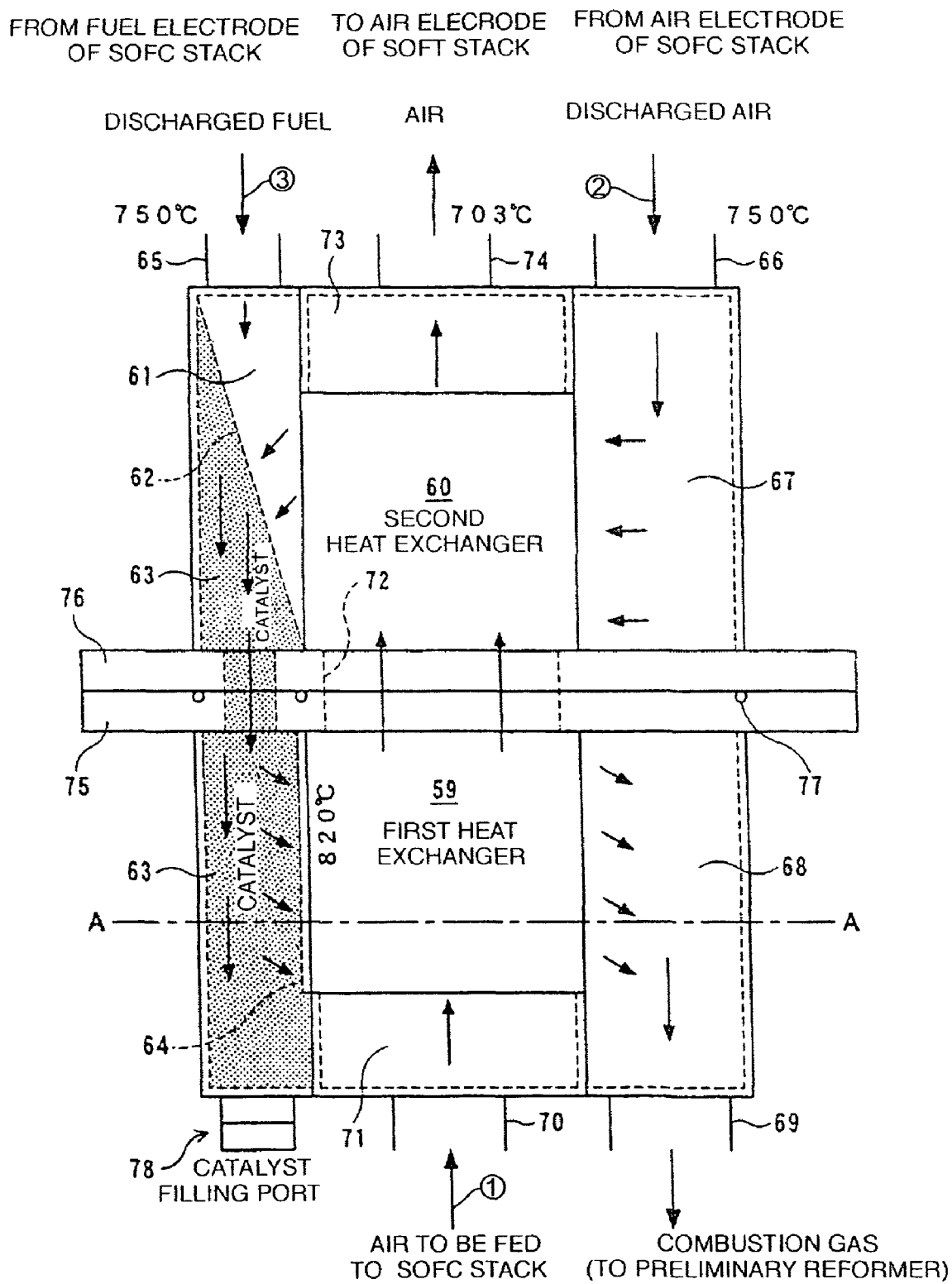
FIG. 24 is a schematic representations illustrating a configuration of the integrated heat exchanger for catalytic combustion, used in the SOFC system according to Embodiment 1 and 2, respectively.
Figure 25:
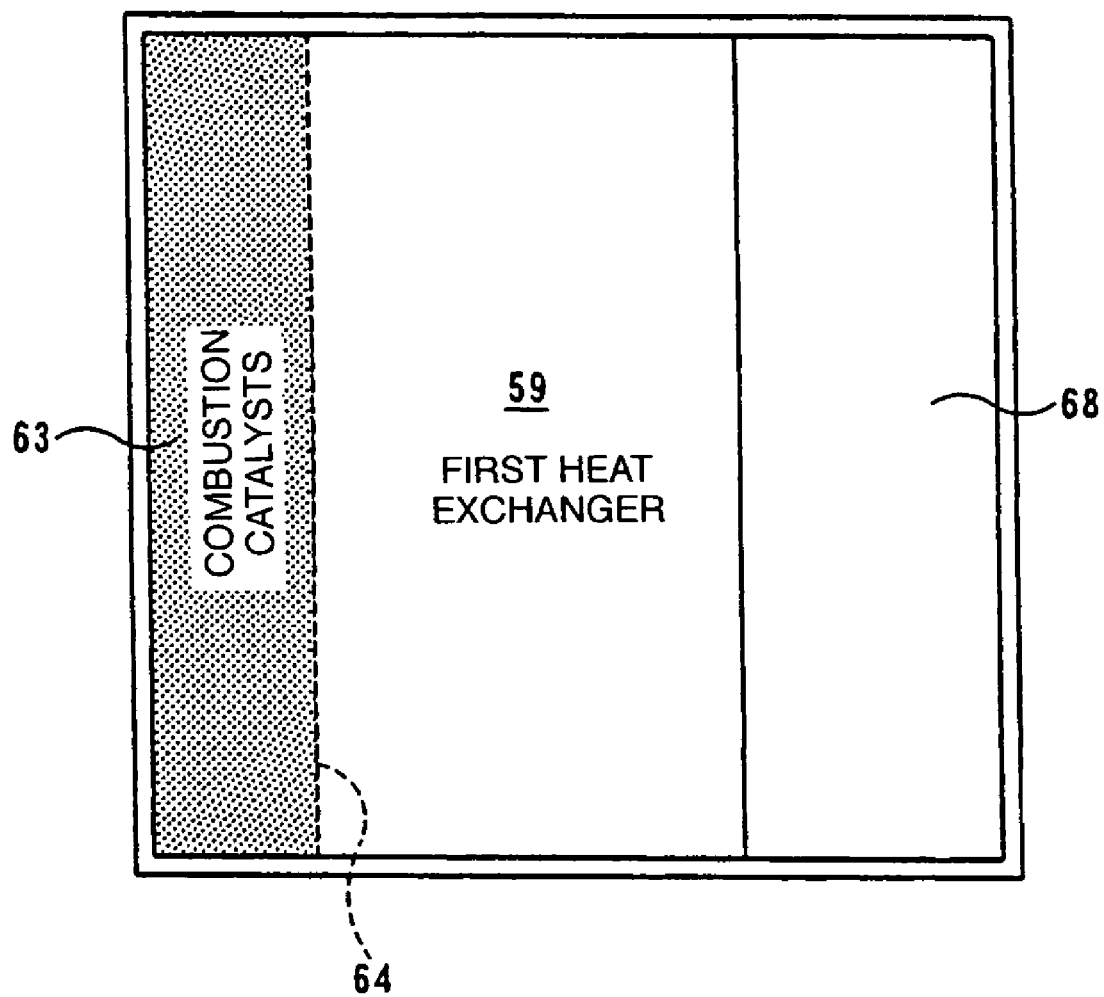
FIG. 25 is a sectional view taken on line A-A in FIG. 24.

FIGS. 24, 25 are schematic representations illustrating a configuration of an integrated heat exchanger for catalytic combustion, respectively, by way of example, and FIG. 24 is a longitudinal sectional view thereof while FIG. 25 is a sectional view taken on line A-A in FIG. 24. In FIG. 24, the arrows indicate respective flow directions of fluids.

As shown in FIG. 24, a first heat exchanger 59 was disposed at the center in the lower part of the integrated heat exchanger for catalytic combustion, and a second heat exchanger 60 at the center in the upper part thereof. Both the heat exchangers were plate-fin type heat exchangers built by alternately stacking tube plates and corrugated fins on top of each other. In both of the heat exchangers, air to be fed to an SOFC stack was heated through indirect heat exchange. A mixture part (mixing chamber) 61 was disposed at a side part of the second heat exchanger 60, and a catalytic combustion layer 63 was disposed so as to be continuous with the mixture part 61 through the intermediary of a baffle (porous plate) 62. The catalytic combustion layer 63 was extended as far as a side part of the first heat exchanger 59, and was linked with the first heat exchanger 59 through the intermediary of a baffle (porous plate) 64. The catalytic combustion layer 63 was filled up with combustion catalysts.

Reference numeral 65 denotes an inlet pipe for discharged fuel from the SOFC stack, 66 an inlet pipe for discharged air from the SOFC stack, 67 an inlet header for the discharged air, 68 an outlet header for a combustion gas, and 69 a discharge pipe for the combustion gas. Reference numeral 70 denotes an inlet pipe for air, 71 an inlet header for the air, 72 a through-hole, 73 an outlet header for the air, and 74 an outlet pipe for the air.

Reference numeral 75 denotes a holding member for component members including the first heat exchanger 59, the catalytic combustion layer 63, and the outlet header 68 for the combustion gas while 76 denotes a holding member for component members including the second heat exchanger 60, the mixture part 61, the baffle 62, catalytic combustion layer 63, and the inlet header 67 for the discharged air. When assembling the integrated heat exchanger for catalytic combustion, the respective component members were caused to be held by the holding members 75, 76, respectively and, subsequently, both the holding members 75, 76 were integrated together and fixedly attached to each other with a metal gasket 77 interposed therebetween. Such fixed attaching thereof was implemented by bolts, or bolts and nuts, although not shown in the figure. Thereafter, combustion catalysts were filled in through an opening of a catalyst filling port 78 and, subsequently, the opening was closely sealed with a plug.

The discharged air from the SOFC stack was guided from the inlet pipe 66 for the discharged air into the second heat exchanger 60 via the inlet header 67, whereupon the air heated (preheated) in the first heat exchanger 59 was further indirectly heated to be subsequently guided into the mixture part 61. The temperature of the discharged air itself dropped through heat exchange therein. In the mixture part 61, the discharged fuel from the discharged fuel inlet pipe 65 was mixed with the discharged air passing through the second heat exchanger 60 and a mixed gas was guided to the catalytic combustion layer 63 via the baffle 62. In the catalytic combustion layer 63, the discharged fuel undergoes combustion with the discharged air and the combustion gas was discharged from the discharge pipe 69 via the baffle 64, the first heat exchanger 59 and the combustion gas outlet header 68. Combustion off-gas as discharged was delivered to the preliminary reformer of the SOFC system to be thereby used as a heating source thereof.

The air passes through the air inlet pipe 70 and the air inlet header 71 to be guided into tubes of the tube plates of the first heat exchanger 59, whereupon the air was indirectly heated (preheated) by the combustion gas before being guided into tubes of the tube plates of the second heat exchanger 60 via the through-hole 72. The air was further indirectly heated by the discharged air, and was subsequently discharged from the air outlet pipe 74 via the air outlet header 73. The air discharged was guided to air electrodes of the SOFC stack to be used for power generation.

All component members of the integrated heat exchanger for catalytic combustion, constructed as above, were made of stainless steel: SUS 310S, and the catalytic combustion layer 63 was filled up with $Pd/Al_2O_3$ catalysts, Pd catalysts with alumina as a carrier, Pd=0.5 wt. %, spherical in shape (average dia.=around 2 mm), serving as combustion catalysts.

In the case where the integrated heat exchanger for catalytic combustion was used as a heat exchanger for heating the fuel to be fed to the SOFC stack instead of using the same as a heat exchanger for heating the air to be fed to the SOFC stack, the constituent members denoted by reference numerals 70 to 74, respectively, were used for the fuel. More specifically, the integrated heat exchanger for catalytic combustion was made up of a fuel inlet pipe 70, fuel inlet header 71, fuel outlet header 73, and fuel outlet pipe 74 via the air. Herein, the fuel guided into the fuel inlet pipe 70 was fuel obtained by reforming the raw fuel in the preliminary reformer.

Further, in the case where the integrated heat exchanger for catalytic combustion was made up as a heat exchanger for heating the air and the fuel to be fed to the SOFC stack, the air and the fuel were individually guided into the first heat exchanger 59, and the second heat exchanger 60, respectively. In such a case, tube plates of the first heat exchanger 59, and the second heat exchanger 60, respectively, were made up of two systems, one for the air, and the other for the fuel such that ① an air inlet pipe, air inlet header, air outlet header, and air outlet pipe as well as ② a fuel inlet pipe, fuel inlet header, fuel outlet header, and fuel outlet pipe were made up so as to correspond to the two systems, respectively.

Embodiment 3

A prototype of the supported membrane type SOFC, the preliminary reformer according to Embodiment 1 (FIG. 23), and the integrated heat exchanger for catalytic combustion according to Embodiment 2 (FIGS. 24, 25) were combined together and housed in the adiabatic vessel 30, thereby building an SOFC system for testing. For the adiabatic vessel, use was made of an adiabatic vessel with glass wool serving as a thermal insulating material 29, disposed around the adiabatic vessel. As shown in FIG. 21, the prototype of the SOFC stack 36, the integrated heat exchanger 32 for catalytic combustion, and the preliminary reformer 31 were assembled inside the adiabatic vessel 30 in sequence from the upper part to the lower part thereof.

For the raw fuel, use was made of a desulfurized town gas (for this reason, the desulfurizer 38 was not disposed). The fuel obtained by bringing in the raw fuel from the inlet pipe 57 via the raw fuel blower 37 and reforming the same in the preliminary reformer 31 was circulated from the discharge pipe 58 into the space of the periphery 42 of the SOFC stack 36 via a duct line to be thereby heated, and was guided to the fuel electrodes of the SOFC stack. For this purpose, the outer wall of the SOFC stack and the inner wall of the adiabatic vessel 30 were made of stainless steel: SUS 310S, and the fuel was circulated in the space therebetween. Air was guided from the air inlet pipe 70 by the air blower 40 to be thereby heated in the integrated heat exchanger for catalytic combustion, and was subsequently guided to the air electrodes of the SOFC stack via a duct line. Water was fed from the pure water tank 39 to the water inlet conduit 51.

Tests were conducted on the SOFC system configured as above. Test conditions in the preliminary reformer 31 were as follows; the raw fuel was town gas 13A (desulfurized), a fuel utilization ratio=80%, oxidizing agent=air, an oxidizing agent utilization ratio=30%, S/C ratio=2.0, and space velocity (steam included)=3000 $h^{-1}$. Constituents, composition and flow rates (NLM=Normal Liter per Minute, the same applies hereinafter) of respective gases fed to the preliminary reformer 31 are shown in Table 1. In FIG. 23, there are also expressed temperatures as measured at respective spots of the preliminary reformer.

TABLE 1

| gas constituents | SOFC off-gas NLM | town gas NLM | town gas (%) |
|---|---|---|---|
| $CH_4$ | 0 | 12.6 | 83.53 |
| $C_2H_6$ | 0 | 0.653 | 4.59 |
| $C_3H_8$ | 0 | 0.767 | 5.39 |
| $C_4H_{10}$ | 0 | 0.213 | 1.50 |
| $H_2O$ | 65.3 | 0 | 0 |
| CO | 0 | 0 | 0 |
| $CO_2$ | 17.02 | 0 | 0 |
| $H_2$ | 0 | 0 | 0 |
| $O_2$ | 54.4 | 0 | 0 |
| $N_2$ | 327.6 | 0 | 0 |

Further, test conditions in the integrated heat exchanger for catalytic combustion were as follows. Space velocity (steam included) in the integrated heat exchanger for catalytic combustion was 3000 $h^{-1}$. Among the test conditions, conditions such as composition, flow rate, temperature, etc. of gases involved were as shown in Table 2 below. In Table 2, gases denoted by ① to ③, respectively, correspond to gases at spots denoted by ① to ③ shown in FIG. 24, respectively, and in FIG. 24, there are also expressed temperatures as measured at respective spots of the integrated heat exchanger for catalytic combustion.

TABLE 2

| gas constituents/ temperature | guided air ① NLM | discharged air ② NLM | discharged fuel ③ NLM | discharged fuel ③ (%) |
|---|---|---|---|---|
| $CH_4$ | 0 | 0 | 0 | 0 |
| $C_2H_6$ | 0 | 0 | 0 | 0 |
| $C_3H_8$ | 0 | 0 | 0 | 0 |
| $C_4H_{10}$ | 0 | 0 | 0 | 0 |
| $H_2O$ (gas) | 0 | 0 | 32.70 | 54.0 |

TABLE 2-continued

| gas constituents/ temperature | guided air ① NLM | discharged air ② NLM | discharged fuel ③ NLM | discharged fuel ③ (%) |
|---|---|---|---|---|
| CO | 0 | 0 | 2.268 | 3.8 |
| $CO_2$ | 0 | 0 | 14.76 | 24.4 |
| $H_2$ | 0 | 0 | 10.79 | 17.8 |
| $O_2$ | 87.2 | 60.95 | 0 | 0 |
| $N_2$ | 327.6 | 327.6 | 0 | 0 |
| temperature | room temp | 750° C. | 750° C. | 750° C. |

Results of the Present Tests Conducted on the Preliminary Reformer

Figure 26:
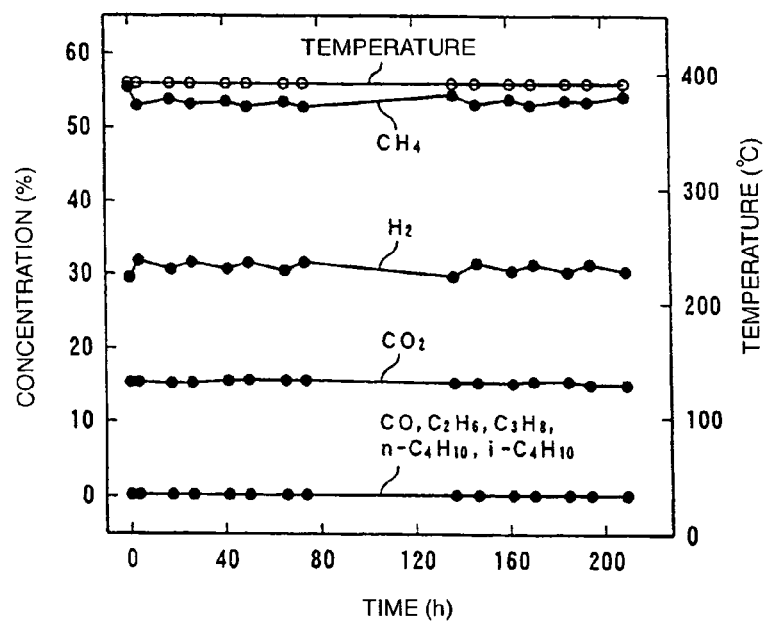
FIG. 26 is a graph showing the results of tests conducted on the preliminary reformer according to Embodiment 1.

FIG. 26 is a graph showing the results of the present tests conducted on the preliminary reformer. The horizontal axis indicates time, the vertical axis on the left-hand side indicates gas concentration, and the vertical axis on the right-hand side indicates temperature at the outlet (an outlet part of the reformation catalyst layer) of the reformed gas delivered from the preliminary reformer. The temperature of the reformed gas at the outlet of the preliminary reformer remained at 395° C. from the outset of the tests, and was substantially constant even after the elapse of 200 hours without undergoing change.

The $CH_4$ concentration underwent only a slight variation up and down for every measurement after the start of the tests, maintaining a substantially 53% level. The $H_2$ concentration as well underwent only a slight variation up and down for every measurement after the start of the tests, maintaining a substantially 30% level. The $CO_2$ concentration remained 14.6% from the outset of the tests, and did not change even after the elapse of 220 hours while the CO constituent and the $C_2$ to $C_4$ constituents were hardly found from the outset of the tests.

Analysis of carbon (C) was conducted on the catalysts in the reformation catalyst layer after the tests. The results showed that carbon (C) was not detected. Further, the reformed gas was heated up to 700° C., and was fed to the SOFC stack, whereupon precipitation of carbon (C) did not occur in the piping and the fuel electrodes. Thus, with the present invention, hydrocarbons having more carbon atoms than those in ethane, that is, the hydrocarbons having two or more carbon atoms are quite effectively removed, so that it is possible to eliminate carbon precipitation due to these hydrocarbons, that is, to eliminate the carbon precipitation occurring in the piping and the fuel electrodes of the SOFC stack before the fuel is fed to the stack.

Results of the Present Tests Conducted on the Integrated Heat Exchanger for Catalytic Combustion With the integrated heat exchanger for catalytic combustion, the discharged air from the SOFC stack (36 in FIG. 21) was lowered in temperature through heat exchange with the air guided into the SOFC stack in the second heat exchanger (35 in FIG. 21, 60 in FIG. 24), and was mixed with the discharged fuel in the mixture part (61, in FIG. 24) to thereby undergo combustion in the catalytic combustion layer (33 in FIG. 21, 63 in FIG. 24). As a result of the combustion, the temperature went up to 830° C. at the maximum. The maximum temperature was observed at the baffle (64 in FIG. 24) disposed between the catalytic combustion layer and the first heat exchanger. Thus, it was possible to control the maximum temperature achieved of the respective component equipment at 820° C. The air fed at room temperature was heated up to 703° C. The present test was continued for 220 consecutive hours, but no change in effect occurred to these temperatures.

Embodiment 4

Tests were conducted in the same way as with Embodiment 3 except that the fuel to be fed to the SOFC stack in place of the air to be fed to the SOFC stack was fed to the integrated heat exchanger for catalytic combustion used in Embodiment 3. As a result, both the preliminary reformer and the integrated heat exchanger for catalytic combustion obtained advantageous effects similar to those for Embodiment 3.

Embodiment 5

For an SOFC system for testing, in place of the preliminary reformer shown in FIG. 23, used in Embodiment 3 (that is, the preliminary reformer according to Embodiment 1), use was made of a preliminary reformer shown in FIG. 27, which was assembled together with the prototype of the SOFC stack and the integrated heat exchanger for catalytic combustion in such a manner as described with reference to FIG. 22 previously shown.

Figure 27:
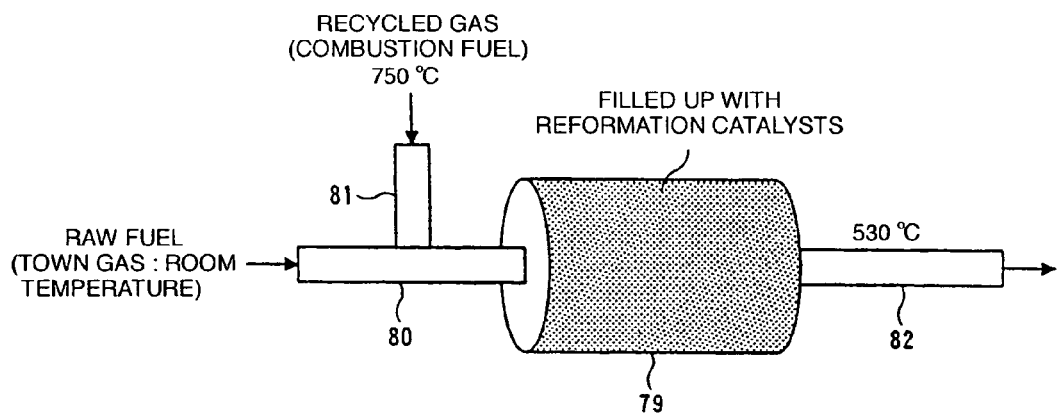
FIG. 27 is schematic representation illustrating a preliminary reformer used in the SOFC system according to Embodiment 3.

As shown in FIG. 27, the present preliminary reformer was made up of a cylindrical vessel 79 filled up with reformation catalysts, and an inlet pipe 81 for recycling the discharge fuel from the SOFC stack was linked with a midpoint of an inlet pipe 80 for the raw fuel. The cylindrical vessel 79 was made of stainless steel: SUS 310S, and was filled with the same reformation catalysts as those used in Embodiment 1.

The raw fuel was mixed with the discharge fuel via the recycling inlet pipe 81 of the SOFC stack and was subsequently guided into the cylindrical vessel 79 to be thereby reformed by steam contained in the discharge fuel recycled. The present preliminary reformer was configured such that 60% of the discharge fuel was recycled (that is, a recycle ratio=60%) to be mixed into the raw fuel for reuse as the fuel for the SOFC stack. For the raw fuel, use was made of a desulfurized town gas (room temperature). A reformed gas was discharged from a discharge pipe 82 to be circulated in the space of the periphery 42 of the SOFC stack to be further heated before being guided to the fuel electrodes of the SOFC stack 36.

In the integrated heat exchanger for catalytic combustion, the remaining 40% of the discharge fuel from the SOFC stack 36 was caused to undergo combustion with the discharged air, using a combustion gas thus formed as a heat source of the first heat exchanger 34. Otherwise, the tests were conducted in the same way as with Embodiment 3. Constituents, composition and flow rates of respective gases are shown in Table 3. Table 3 is similar to Table 1 and Table 2 except for a flow rate of recycled discharge fuel (=a recycled gas).

TABLE 3

| gas constituents | SOFC off-gas NLM | town gas NLM | town gas composition (%) | recycled gas NLM |
|---|---|---|---|---|
| $CH_4$ | 0 | 12.6 | 83.53 | 0 |
| $C_2H_6$ | 0 | 0.653 | 4.59 | 0 |
| $C_3H_8$ | 0 | 0.767 | 5.39 | 0 |
| $C_4H_{10}$ | 0 | 0.213 | 1.50 | 0 |
| $H_2O$ | 65.3 | 0 | 0 | 32.7 |
| CO | 0 | 0 | 0 | 2.268 |
| $CO_2$ | 17.02 | 0 | 0 | 14.76 |
| $H_2$ | 0 | 0 | 0 | 10.79 |
| $O_2$ | 54.4 | 0 | 0 | 0 |
| $N_2$ | 327.6 | 0 | 0 | 0 |

Figure 28:
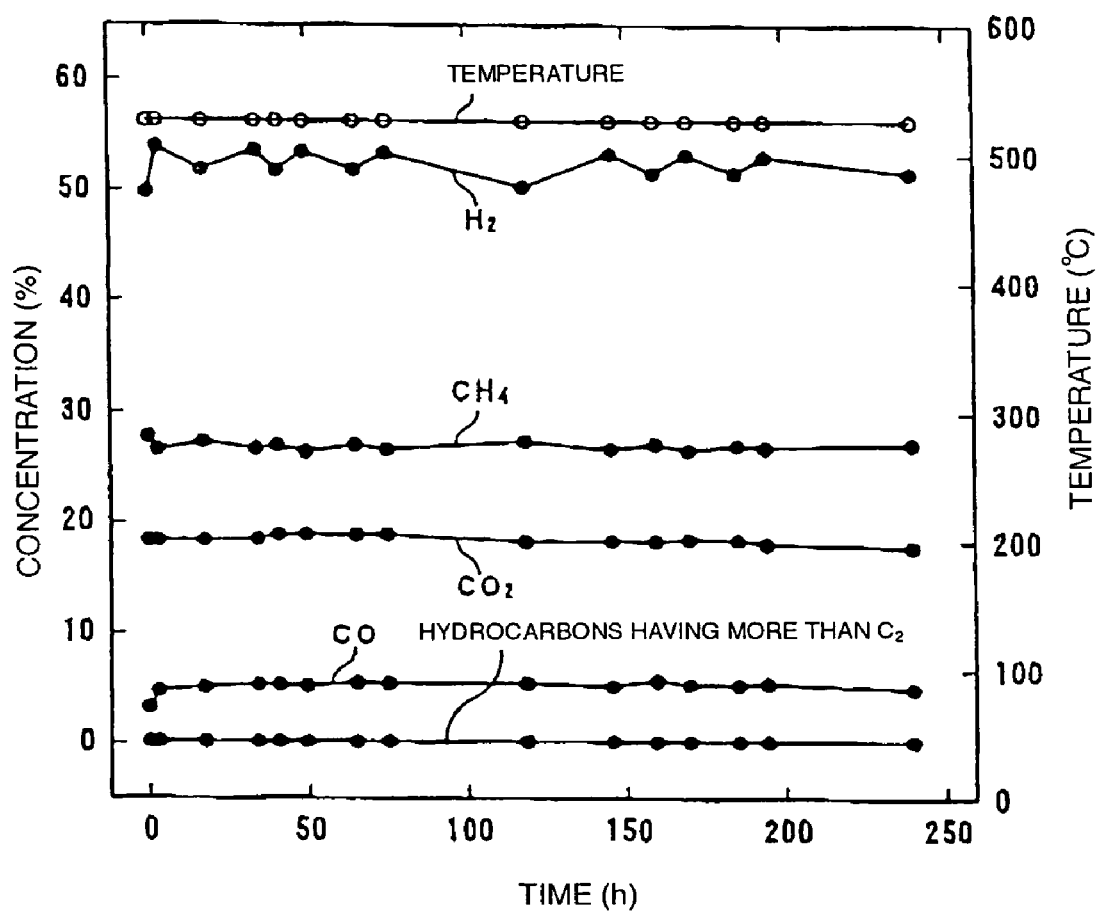
FIG. 28 is a graph showing the results of tests conducted on the preliminary reformer according to Embodiment 3.

FIG. 28 is a graph showing the results of the present tests conducted on the preliminary reformer. In FIG. 28, the horizontal axis, vertical axis on the left-hand side, and vertical axis on the right-hand side indicate the same items as those in FIG. 26. As shown in FIG. 28, the combustion gas, that is, the combustion gas formed by causing the remaining 40% of the discharge fuel from the SOFC stack 36 to undergo combustion with the discharged air was at 530° C., and was substantially constant even after the elapse of 240 hours without undergoing change.

The $CH_4$ concentration underwent only slight variation up and down after the start of the tests, maintaining a substantially 27% level. The $H_2$ concentration as well underwent only a slight variation up and down for every measurement after the start of the tests, maintaining a substantially 52% level. The $CO_2$ concentration remained on the order of 19% from the outset of the tests, and did not change even after the elapse of 240 hours and, further, the CO concentration remained on the order of 5% from the outset of the tests, undergoing little change even after the elapse of 240 hours. Particularly, hydrocarbons having two or more carbon atoms, such as $C_2H_6$, $C_3H_8$, n-$C_4H_{10}$, i-$C_4H_{10}$, etc were not detected after the start of the tests. Thus, with the present invention, hydrocarbons having more carbon atoms than those in ethane, that is, the hydrocarbons having two or more carbon atoms were quite effectively removed, so that carbon precipitation due to these hydrocarbons, that is, carbon precipitation otherwise occurring in the piping and the fuel electrodes of the SOFC stack before the fuel is fed to the stack could be eliminated.

As to the results of the present tests on the integrated heat exchanger for catalytic combustion, the same results as those for Embodiment 3 was obtained from this test as well. It was thus possible to control the maximum temperatures of the respective component equipment at 820° C. The tests were continued for 240 consecutive hours, but no change in effect occurred to these temperatures.

EFFECTS OF THE INVENTION

With the SOFC system according to the invention, by disposing the SOFC stack, the preliminary reformer, and the integrated heat exchanger for catalytic combustion jointly in the adiabatic vessel, the combined advantages of the preliminary reformer and the integrated heat exchanger for catalytic combustion can be obtained and the heat loss of the SOFC system can be eliminated or reduced as much as possible.

Further, with the preliminary reformer according to the invention, hydrocarbons having two or more carbon atoms are quite effectively removed from the fuel fed to the SOFC stack, thereby enabling carbon precipitation otherwise occurring in the piping leading to the SOFC stack and the fuel electrodes of the SOFC stack to be eliminated.

In addition, with the integrated heat exchanger for catalytic combustion according to the invention, since the air and/or the fuel, to be fed to the SOFC stack, can be heated while controlling the maximum temperature achieved thereof, the integrated heat exchanger for catalytic combustion is quite useful as an heat exchanger for an SOFC with the operation temperature on the order of 850° C. or lower, particularly, for a supported membrane type SOFC. Further, the same is quite useful in making up an SOFC system because an inexpensive material can be used as the constituent material of the component equipment of the system and the system on the whole can be reduced in size, and so forth.

The invention claimed is:
1. A solid oxide fuel cell system comprising:
a preliminary reformer for removing hydrocarbons having two or more carbon atoms from a raw fuel and generating fuel; a solid oxide fuel cell stack for generating electricity from an oxidizing agent and fuel and discharging a fuel off-gas and an oxidizing agent off-gas; an integral heat exchanger and catalytic combustion layer for receiving the discharged fuel off-gas and oxidizing agent off-gas from the solid oxide fuel cell stack and discharging a combustion gas, the integral heat exchanger and catalytic combustion layer comprising a first heat exchanger for pre-heating at least one of the oxidizing agent and the fuel to be fed to the solid oxide fuel cell stack, the catalytic combustion layer and a second heat exchanger for pre-heating at least one of the oxidizing agent and the fuel to be fed to the solid oxide fuel cell stack, and an adiabatic vessel containing the preliminary reformer, the solid oxide fuel cell stack and the integral heat exchanger and catalytic combustion layer.

2. The solid oxide fuel cell system of claim 1, wherein the preliminary reformer is filled with reformation catalysts and is capable of utilizing either the discharged oxidizing agent off-gas or the discharged fuel off-gas, delivered from the solid oxide fuel cell stack, or both the discharged oxidizing agent off-gas and the discharged fuel off-gas as a heating source.

3. The solid oxide fuel cell system of claim 1, wherein the preliminary reformer is filled with reformation catalysts and is capable of utilizing the combustion gas formed by combusting the discharged fuel off-gas from the solid oxide fuel cell stack with the use of the discharged oxidizing agent off-gas as a heating source.

4. The solid oxide fuel cell system of claim 1, wherein the preliminary reformer is filled with reformation catalysts and is capable of removing the hydrocarbons having two or more carbon atoms from the raw fuel by preheating water to thereby convert the same into steam while preheating the raw fuel, and by guiding a mixed gas of both the steam and preheated raw fuel into the preliminary reformer.

5. The solid oxide fuel cell system of claim 1, wherein the preliminary reformer is filled with reformation catalysts and is capable of removing the hydrocarbons having two or more carbon atoms from the raw fuel by recycling a portion of the discharged fuel off-gas from the solid oxide fuel cell stack to be mixed with the raw fuel, thereby causing a reaction therebetween.

6. The solid oxide fuel cell system of claim 1, wherein the preliminary reformer is filled with reformation catalysts and is capable of removing the hydrocarbons having two or more carbon atoms from the raw fuel solely by utilizing heat due to a reformation reaction therein.

7. The solid oxide fuel cell system of claim 1, wherein the preliminary reformer is filled with oxidation catalysts and is capable of removing the hydrocarbons having two or more carbon atoms from the raw fuel by causing the raw fuel to undergo partial combustion with air.

8. The solid oxide fuel cell of claim 7, wherein the oxidation catalysts comprise at least one of platinum and palladium.

9. The solid oxide fuel cell system of claim 1, wherein the preliminary reformer is filled with oxidation catalysts and is capable of removing the hydrocarbons having two or more carbon atoms from the raw fuel by causing the raw fuel to undergo partial combustion with air, and supplementally heating itself by utilizing either the discharged oxidizing agent off-gas or the discharged fuel off-gas from the solid oxide fuel cell stack, or both the discharged oxidizing agent off-gas and the discharged fuel off-gas.

10. The solid oxide fuel cell system of claim 1, wherein the preliminary reformer is filled with oxidation catalysts and is capable of removing the hydrocarbons having two or more carbon atoms from the raw fuel by causing the raw fuel to undergo partial combustion with air, and utilizing the combustion gas formed by combusting the discharged fuel off-gas from the solid oxide fuel cell stack with the use of the discharged oxidizing agent off-gas as a heating source.

11. The solid oxide fuel cell system of claim 10, wherein the air to be guided to the SOFC stack is heated on a periphery of the solid oxide fuel cell stack before being fed thereto.

12. The solid oxide fuel cell system according to claim 1, wherein the fuel to be guided into the solid oxide fuel cell stack is preheated in the first heat exchanger by use of the combustion gas formed in the catalytic combustion layer to be subsequently heated in the second heat exchanger by use of the discharged oxidizing agent off-gas or the discharged fuel off-gas, from the solid oxide fuel cell stack, or both, before being fed to the solid oxide fuel cell stack.

13. The solid oxide fuel cell system of claim 1, wherein the oxidizing agent and fuel, to be guided into the solid oxide fuel cell stack, are preheated in the first heat exchanger by use of the combustion gas formed in the catalytic combustion layer to be subsequently heated in the second heat exchanger by use of the discharged oxidizing agent off-gas or the discharged fuel off-gas, from the solid oxide fuel cell stack, or both, before being fed to the solid oxide fuel cell stack.

14. The solid oxide fuel cell system of claim 1, wherein the oxidizing agent to be guided into the solid oxide fuel cell stack is preheated in the second heat exchanger by use of the discharged oxidizing agent off-gas or the discharged fuel off-gas, from the solid oxide fuel cell stack, or both, to be subsequently heated in the first heat exchanger by use of the combustion gas formed in the catalytic combustion layer before being fed to the solid oxide fuel cell stack.

15. The solid oxide fuel cell system of claim 1, wherein the fuel to be guided into the solid oxide fuel cell stack is preheated in the second heat exchanger by use of the discharged oxidizing agent off-gas or the discharged fuel off-gas, from the SOFC stack, or both, to be subsequently heated in the first heat exchanger by use of the combustion gas before being fed to the solid oxide fuel cells.

16. The solid oxide fuel cell system of claim 1, wherein the oxidizing agent and fuel, to be guided into the solid oxide fuel cell stack, are preheated in the second heat exchanger by the discharged oxidizing agent off-gas or the discharged fuel off-gas, from the solid oxide fuel cell stack, or both, to be subsequently heated in the first heat exchanger by the combustion gas before being fed to the solid oxide fuel cells.

17. The solid oxide fuel cell system of claim 1, wherein the preliminary reformer, the integral heat exchanger and catalytic combustion layer and the solid oxide fuel cell stack are positioned in that order, respectively, from a lower portion to an upper portion of the adiabatic vessel.

18. The solid oxide fuel cell system of claim 1, wherein the solid oxide fuel cell stack, the integral heat exchanger and catalytic combustion layer and the preliminary reformer are positioned in that order, respectively, from a lower portion to an upper portion of the adiabatic vessel.

19. The solid oxide fuel cell system of claim 1, wherein the integral heat exchanger and catalytic combustion layer, the solid oxide fuel cell stack and the preliminary reformer are positioned in that order, respectively, from a lower portion to an upper portion of the adiabatic vessel.

20. The solid oxide fuel cell system of claim 1, wherein the preliminary reformer, the solid oxide fuel cell stack and the integral heat exchanger and catalytic combustion layer are positioned in that order, respectively, from a lower portion to an upper portion of the adiabatic vessel.

21. The solid oxide fuel cell system of claim 1, comprising means for heating the fuel on the periphery of the solid oxide fuel cell stack before feeding the fuel thereto.

22. The solid oxide fuel cell system of claim 1, additionally comprising means for feeding the discharged oxidizing agent off-gas from the solid oxide fuel cell stack through the second heat exchanger before being fed to the catalyst combustion layer and means for feeding the combustion gas to the first heat exchanger for indirectly heating the oxidizing agent and the fuel and then for heating the preliminary reformer.

23. The solid oxide fuel cell system of claim 1, additionally comprising means for feeding the discharged oxidizing agent off-gas from the solid oxide fuel cell stack through the second heat exchanger before being fed to the catalyst combustion layer, means for feeding the combustion gas to the first heat exchanger for indirectly heating the oxidizing agent and the fuel and then for heating the preliminary reformer and means for separating a part of the discharged fuel off-gas from the solid oxide fuel cell stack and mixing it with the raw fuel being fed to the preliminary reformer.

24. The solid oxide fuel cell system of claim 1, additionally comprising means for feeding the discharged oxidizing agent off-gas from the solid oxide fuel cell stack through the second heat exchanger before being fed to the catalyst combustion layer, means for feeding the combustion gas to the first heat exchanger for indirectly heating the oxidizing agent and the fuel and then for heating the preliminary reformer and means for guiding the fuel generated in the preliminary reformer to the solid oxide fuel cell stack via a periphery of the solid oxide fuel cell stack.

25. The solid oxide fuel cell system of claim 1, additionally comprising means for feeding the discharged oxidizing agent off-gas from the solid oxide fuel cell stack through the second heat exchanger before being fed to the catalyst combustion layer, means for feeding the combustion gas to the first heat exchanger for indirectly heating the oxidizing agent and then for heating the preliminary reformer and means for separating a part of the discharged fuel off-gas from the solid oxide fuel cell stack and mixing it with the raw fuel being fed to the preliminary reformer.

* * * * *